(12) United States Patent
Fisher et al.

(10) Patent No.: US 12,552,233 B2
(45) Date of Patent: Feb. 17, 2026

(54) DELIVERY VEHICLE

(71) Applicant: The Shyft Group, Inc., Charlotte, MI (US)

(72) Inventors: Eric R. Fisher, Elkhart, IN (US); Samuel Francis Colalillo, Jr., New Carlisle, IN (US); Matt Rinkenbaugh, Goshen, IN (US); Cody Michael Huber, Elkhart, IN (US); Blake Soffa, LaPorte, IN (US); Douglas Lee Sagarsee, Elkhart, IN (US)

(73) Assignee: The Shyft Group, Inc., Charlotte, MI (US)

( * ) Notice: Subject to any disclaimer, the term of this patent is extended or adjusted under 35 U.S.C. 154(b) by 402 days.

(21) Appl. No.: 18/172,822

(22) Filed: Feb. 22, 2023

(65) Prior Publication Data
US 2023/0278404 A1 Sep. 7, 2023

Related U.S. Application Data

(60) Provisional application No. 63/317,115, filed on Mar. 7, 2022.

(51) Int. Cl.
B60J 5/04 (2006.01)
B60J 5/06 (2006.01)

(52) U.S. Cl.
CPC .............. B60J 5/0497 (2013.01); B60J 5/06 (2013.01)

(58) Field of Classification Search
CPC . B60J 5/0497; B60J 5/06; E05B 85/12; E05B 79/22; E05B 83/40
USPC .................................................... 296/190.11
See application file for complete search history.

(56) References Cited

U.S. PATENT DOCUMENTS 3,714,738 A * 2/1973 Koslow ................... E05D 13/06
49/404
4,341,042 A * 7/1982 Schulz .................... E05B 65/08
49/404
4,364,249 A * 12/1982 Kleefeldt ................ E05B 81/16
292/201

(Continued)

FOREIGN PATENT DOCUMENTS

DE 548419 C * 4/1932
DE 1509901 A1 * 7/1969

(Continued)

OTHER PUBLICATIONS

International Search Report & Written Opinion-Dated Sep. 25, 2023; PCT/US2023/014486; Filed Mar. 3, 2023.

Primary Examiner — Hilary L Gutman
(74) Attorney, Agent, or Firm — Barnes & Thornburg LLP

(57) ABSTRACT

A delivery vehicle with a vehicle body comprising a cab portion and a rear cargo portion. The cab portion includes a driver's side and a passenger's side. There is a passenger's door for entering and exiting the passenger's side by climbing one or more steps adjacent the passenger's door. In some embodiments, there is an inside passenger door handle is provided that extends within the cab portion and is configured to actuate a latch assembly between its latched and unlatched positions. In some embodiments, at least a portion of the inside passenger door handle extends into the cab area to be reachable without stooping down the one or more steps adjacent the passenger's door.

19 Claims, 23 Drawing Sheets

(56) References Cited

U.S. PATENT DOCUMENTS

| | | | |
|---|---|---|---|
| 4,440,006 A | 4/1984 | Kleefeldt | |
| 5,357,143 A | 10/1994 | Lehr et al. | |
| 11,724,624 B2 * | 8/2023 | Eisenberg | E05B 29/00 |
| | | | 410/129 |
| 2010/0058666 A1 | 3/2010 | Kim | |
| 2022/0009563 A1 | 1/2022 | Andrews et al. | |

FOREIGN PATENT DOCUMENTS

| | | | | |
|---|---|---|---|---|
| DE | 2637052 A | * | 2/1977 | ............... E05F 7/04 |
| JP | S6180974 U | * | 5/1986 | |
| JP | 2015120408 A | * | 7/2015 | |
| KR | 102699757 B1 | * | 8/2024 | |

* cited by examiner

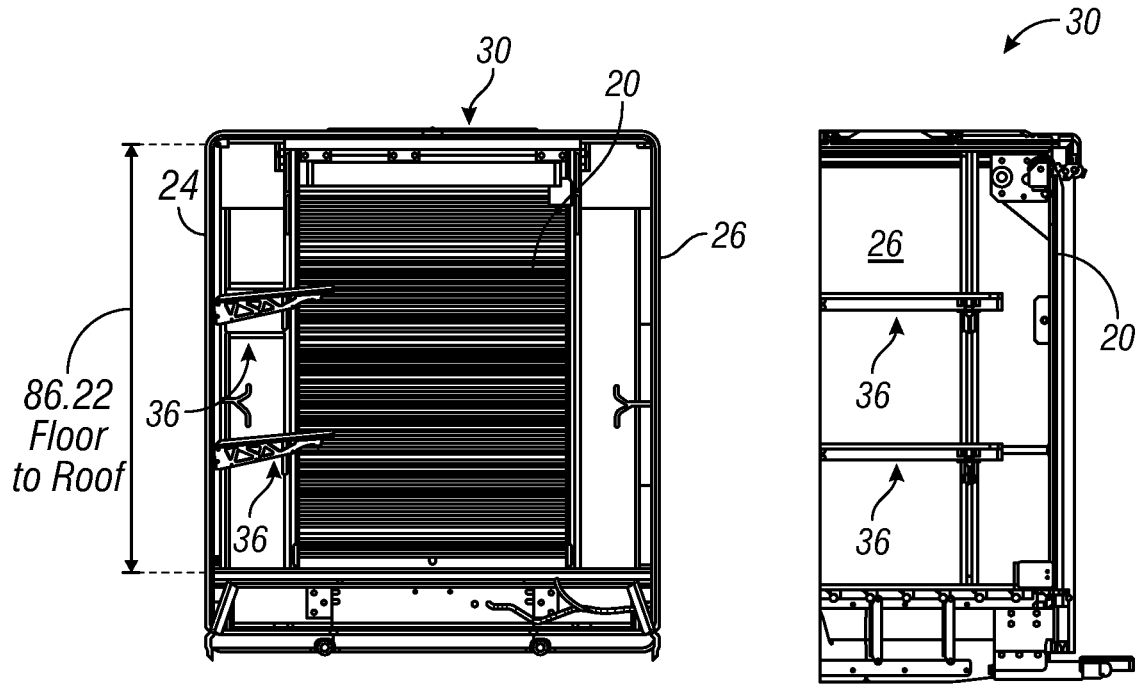
FIG. 34    FIG. 35
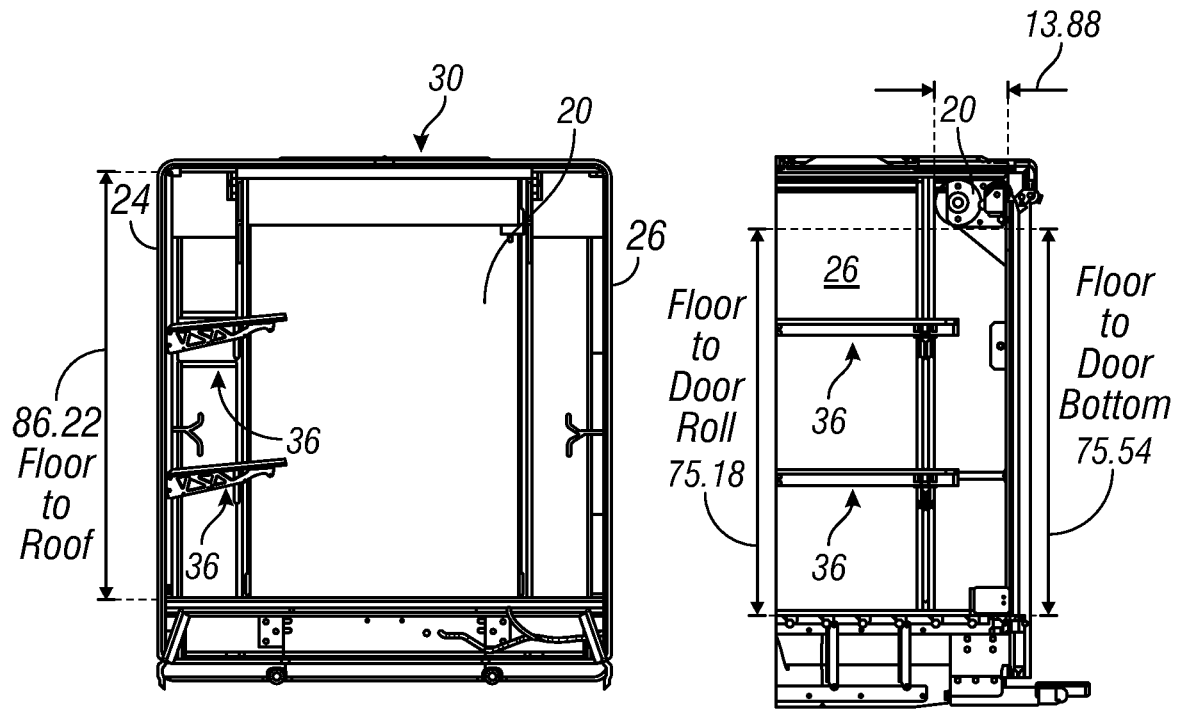
FIG. 36    FIG. 37

DELIVERY VEHICLE

RELATED APPLICATIONS

This application claims the benefit of U.S. Provisional Application Ser. No. 63/317,115 filed Mar. 7, 2022 for a "Delivery Vehicle," which is hereby incorporated by reference in its entirety.

TECHNICAL FIELD

This disclosure relates generally to commercial fleet vehicles; in particular, this relates to cab and body features of fleet vehicles, such as a delivery truck, walk-in van, mobile retail vehicle, mass transit, etc.

BACKGROUND

Challenges arise in loading delivery trucks and delivering goods to their ultimate destination. Drivers must drive to destination addresses on their route of packages to be delivered. At each location, the driver must park at a location near the destination address, find the package(s) to be delivered from the cargo area, and get out of the delivery vehicle to move the package(s) to their delivery location. Each of these steps can take time to deliver the package(s). Any improvements in the vehicle design and driver automation systems that allow more efficient package deliveries, can result in time savings. Opportunities for time savings in any of these steps is magnified across an entire route, and throughout the entire delivery vehicle fleet, which can mean significant time savings.

Therefore, there is a need for improving the way in which delivery vehicles are designed, loaded and/or operated to deliver packages.

SUMMARY

In one aspect, this disclosure provides a delivery vehicle with a vehicle body comprising a cab portion and a rear cargo portion. The cab portion includes a driver's side with a driver's door for entering and exiting the cab portion on the driver's side and a passenger's side with a passenger's door for entering and exiting the cab portion from the passenger's side. The cab portion includes a floor extending between the driver's side and the passenger's side and one or more steps adjacent the passenger's door. There is also a latch assembly moveable between a latched position that latches the passenger's door and an unlatched position that unlatches the passenger's door. An inside passenger door handle is provided that extends within the cab portion and is configured to actuate the latch assembly between the latched position and the unlatched position. In some embodiments, at least a portion of the inside passenger door handle extends into the cab area to be reachable while on the floor without climbing down the one or more steps adjacent the passenger's door.

According to another aspect, this disclosure provides a delivery vehicle with a vehicle body comprising a cab portion and a rear cargo portion with a bulkhead door therebetween. The cab portion includes a driver's side and a passenger's side. The delivery vehicle includes a sliding passenger door for entering and exiting the passenger's side of the cab. There is a latch assembly moveable between a latched position that latches the passenger door in a closed position and an unlatched position that unlatches the passenger door. The delivery vehicle includes an inside passenger door handle extending within the cab portion and configured to actuate the latch assembly between the latched position and the unlatched position. In some embodiments, the cab portion includes a dashboard and at least a portion of the inside passenger door handle is positioned vertically at or above the dashboard.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

FIG. 34 is a rear view of the rear cargo door from within of the cargo storage area with the door in a closed position according to an embodiment of this disclosure;

FIG. 35 is a partial side cross-sectional view of the rear cargo area with the door in a closed position according to an embodiment of this disclosure;

FIG. 36 is a rear view of the cargo storage area with the rear cargo door in an open position according to an embodiment of this disclosure;

FIG. 37 is a partial side cross-sectional view of the rear cargo area with the rear cargo door in an open position according to an embodiment of this disclosure;

DETAILED DESCRIPTION OF THE DRAWINGS

Figure 1:
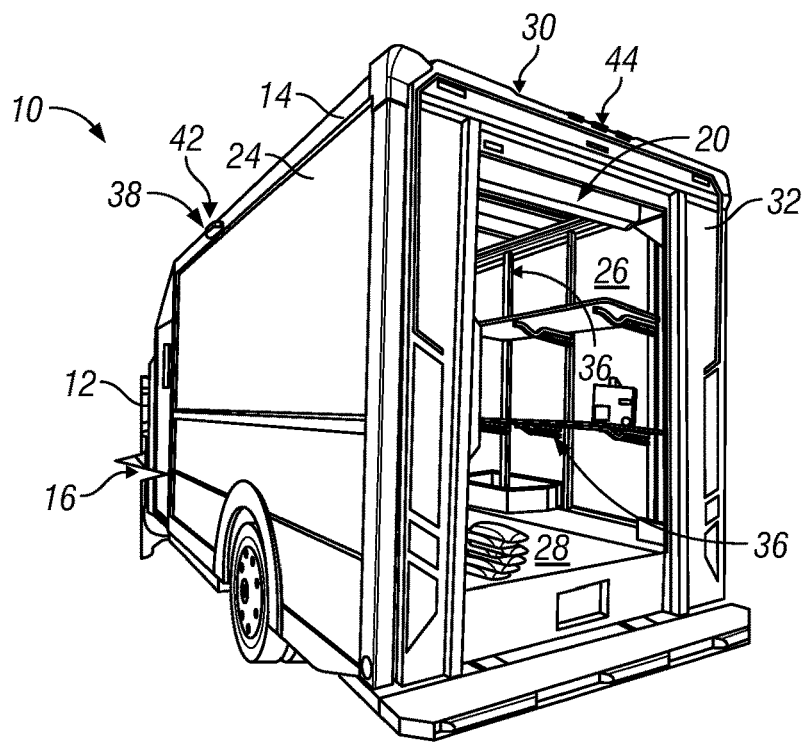
FIG. 1 is a driver-side rear perspective view of an example delivery vehicle according to an embodiment of this disclosure.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural features may be shown in specific arrangements. However, it should be appreciated that such specific arrangements may not be required. Rather, in some embodiments, such features may be arranged in a different manner than shown in the illustrative figures. Additionally, the inclusion of a structural in a particular figure is not meant to imply that such feature is required in all embodiments and, in some embodiments, may not be included or may be combined with other features.

This disclosure relates generally to a commercial vehicle or fleet vehicle. Although the description herein is made with reference to a walk-in van for purposes of example, other types of commercial and fleet vehicles, cargo vehicles, mobile retail vehicles, etc. could be used in conjunction with one or more of the features described herein. The term "delivery vehicle" is broadly intended to encompass all types of commercial and/or fleet vehicles and should not be limited to a walk-in van. In some cases, the delivery vehicle may be embodied as an electric vehicle (EV) or internal combustion engine (ICE) vehicle.

Figure 2:
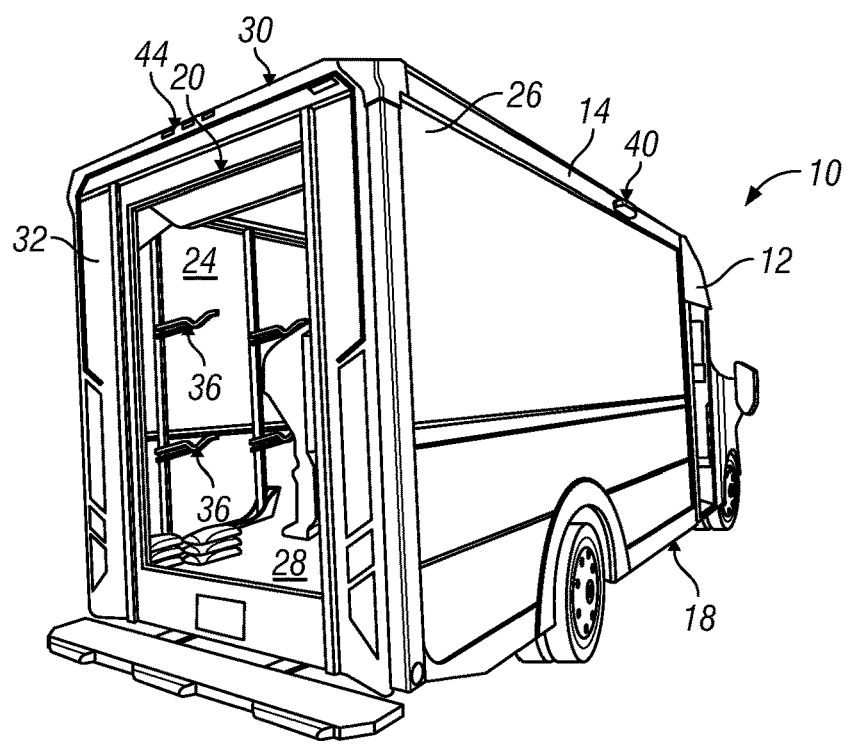
FIG. 2 is a passenger-side rear perspective view of the example delivery vehicle shown in FIG. 1.
Figure 3:
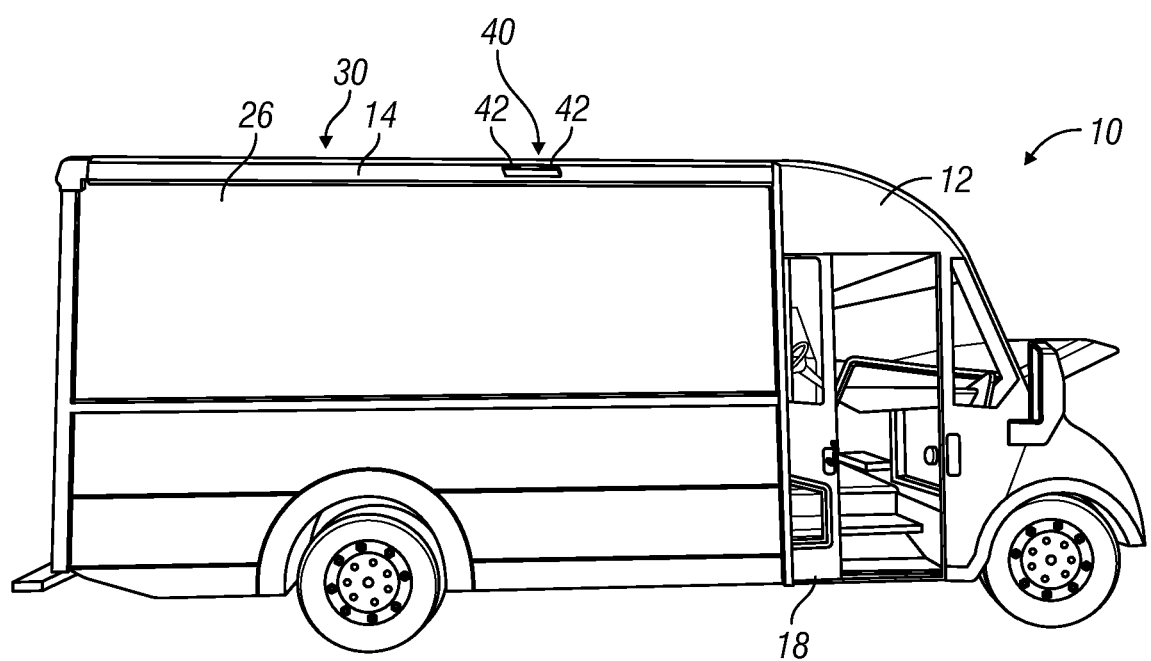
FIG. 3 is a passenger-side view of the example delivery vehicle shown in FIG. 1.
Figure 41:
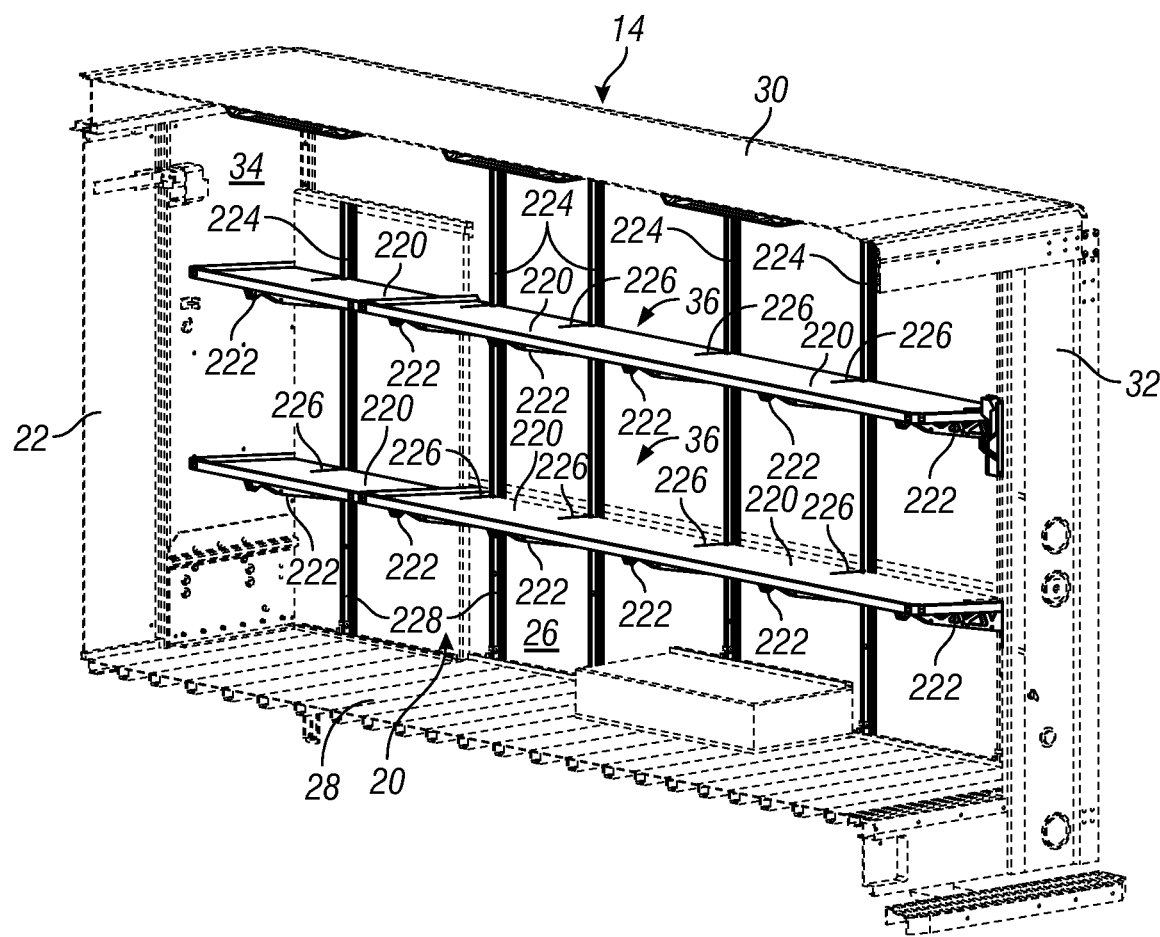
FIGS. 41 and 42 are a perspective cross-sectional views of the rear cargo area with the shelf assemblies in the extended and retracted positions, respectively.
Figure 42:
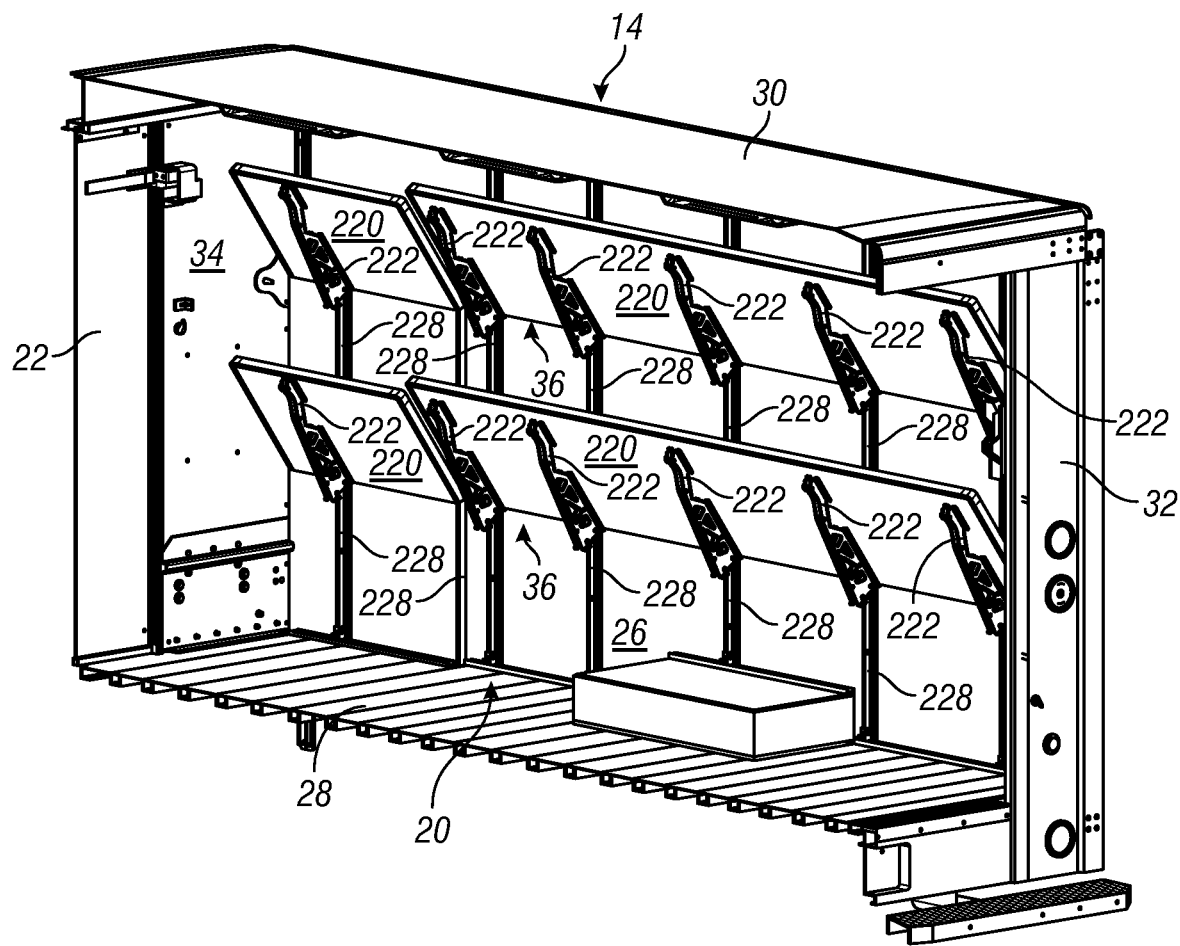

Referring to FIGS. 1-3, there is shown an example embodiment of a delivery vehicle 10 according to an embodiment of this disclosure. As shown, the delivery vehicle 10 includes a cab portion 12 and a rear cargo area 14. The cab portion 12 may be accessed through a driver door 16 or a passenger door 18. The rear cargo area 14 may be accessed through a rear cargo door 20. Additionally, the rear cargo area 14 may be accessed from the cab portion 12 through a bulkhead door 22 (FIGS. 41-42).

As shown, the rear cargo area 14 includes a driver side wall 24 spaced apart from a passenger side wall 26 by a floor 28 and a roof 30. The rear cargo area 14 may also include a rear wall 32 to which the rear cargo door 20 is mounted and a front wall 34 to which the bulkhead door 22 is mounted (FIGS. 41-42). One or more storage systems may be provided within the rear cargo area 14, such as one or more shelving systems 36 mounted to the driver side wall 24 and/or passenger side wall 26.

In the embodiment shown, there is a driver side camera assembly 38 mounted on the driver side wall 24 near the roof 30. There is also a passenger side camera assembly 40 mounted on the passenger side wall 26 near the roof 30. For example, the driver side camera assembly 38 and the passenger side camera assembly 40 may form part of a 360 view camera system. In some embodiments, the driver side camera assembly 38 and/or the passenger side camera assembly 40 may include integral lights 42 to increase visibility of the delivery vehicle 10 to surrounding vehicles and pedestrians. For example, there may be lights 42 on each side of the camera in the camera assemblies 38, 40. The side lights 42 may be tied to the turn signal lights and hazard lights to increase visibility to surrounding vehicles and pedestrians. In some cases the rear wall 32 may include one or more rear lights 44 mounted near the roof 30 to address similar visibility concerns from the rear area of the delivery vehicle 10, which could be integrated into a rear camera assembly. For example, the rear lights 44 mounted to the rear wall 32 may be tied to the hazard lights, brake lights or other vehicle lights.

Figure 4:
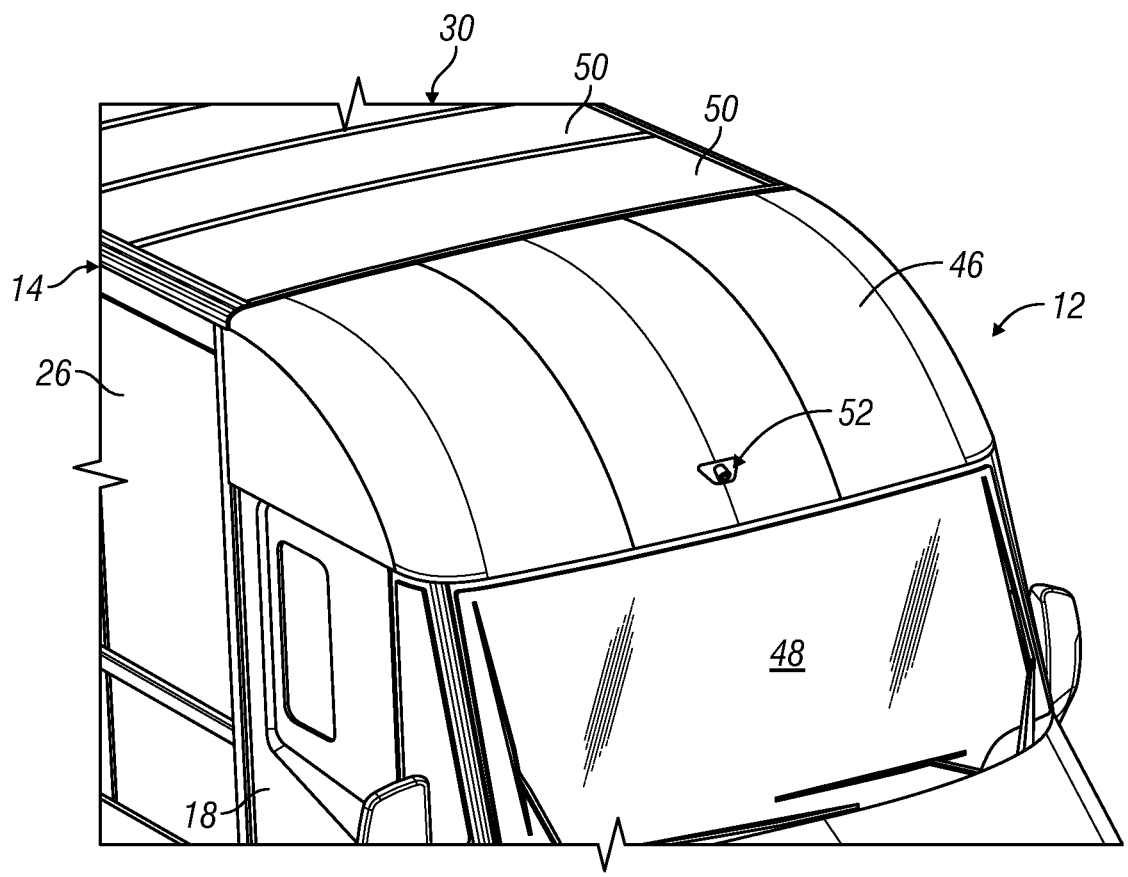
FIG. 4 is a front perspective view of an example delivery vehicle showing, among other things, an integral roof-mounted camera.
Figure 5:
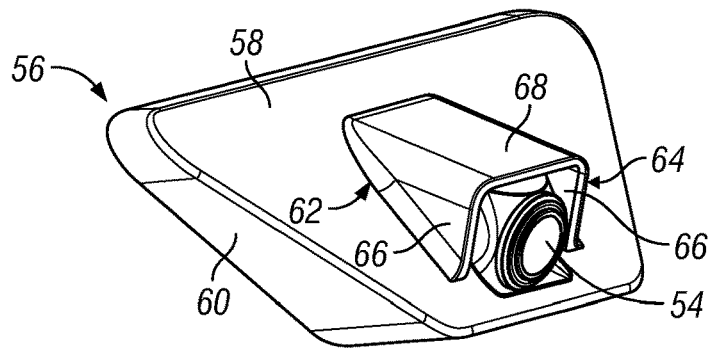
FIG. 5 is a detailed front perspective view of the integral roof-mounted camera shown in FIG. 4.
Figure 6:
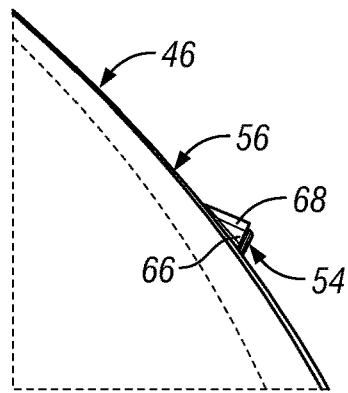
FIG. 6 is a side view of the roof-mounted camera shown in FIG. 4.
Figure 7:
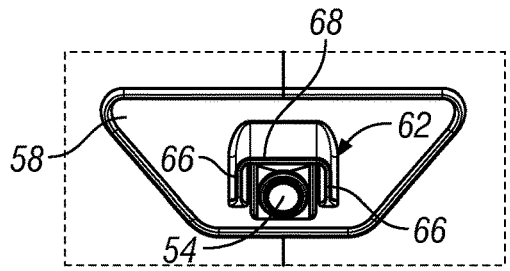
FIG. 7 is a front view of the roof-mounted camera shown in FIG. 4.

Referring now to FIG. 4, the roof 30 of the rear storage area 14 and a roof 46 of the cab portion 12 can be seen. A windshield 48 extends downwardly from the roof 46 of the cab portion 12. In some embodiments, one or more solar panels 50 may be mounted flush with the roof 30 of the rear storage area 14. The solar panels 50 may be configured to harvest solar energy, which could be used for a variety of power consumption devices within the delivery vehicle 10. In some cases, the delivery vehicle 10 may be an electric vehicle (EV) and the solar panels 50 may be used to recharge the batteries of the EV. In other cases, the solar panels 50 may be used to power lights or other auxiliary power systems within the delivery vehicle 10. Depending on the circumstances, there may be an electrical connection between the solar panels 50 and one or more power consumption systems within the vehicle through cables extending through the roof 30 of the rear storage area 14 (see FIGS. 38 and 39).

Referring now also to FIGS. 5-8, in the embodiment shown, there is a camera assembly 52 mounted to the roof 46 of the cab portion 12. For example, the camera assembly 52 may be part of a 360 view camera system in the delivery vehicle 10. Instead of using unsightly brackets for mounting a front view camera as is done on existing vehicles, the camera assembly 52 is integrally mounted to the roof 46. As shown, the camera assembly 52 includes a video camera 54 and a body molding member 56 that forms a portion of the roof 46 and serves as a cover for the video camera 54. In the embodiment shown, the roof 46 of the cab 12 has a substantially convex curvature between the windshield 48 and the roof 30 of the rear cargo area 14. In some cases, at least a portion of the body molding member 56 has a corresponding convex curvature to create a substantially uninterrupted surface curvature between the surface of the roof 46 and at least a portion of the body molding member 56.

In the embodiment shown, the body molding member 56 includes base portion 58 with a lip 60 extending around its periphery. In some cases, the roof 46 of the cab 12 includes an opening configured to receive the lip 60 of the body molding member 56. As shown, the base portion 58 is formed substantially as a trapezoid with rounded corners and the opening in the roof 46 would have a corresponding shape, but other shapes could be used depending on the circumstances. In some cases, the base portion 58 has a convex curvature to correspond with the convex curvature of the roof 46 to create a substantially uninterrupted surface between the base 58 and the roof 46. The uninterrupted surface between the roof 46 and the base 58 can be seen in FIG. 6.

Figure 8:
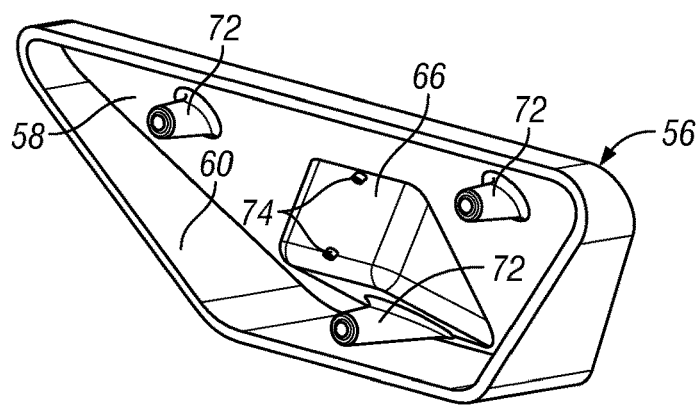
FIG. 8 is a rear perspective view of an example body molding to mount the camera to the roof of the cab according to an embodiment of the disclosure.

In the embodiment shown, a pocket 62 with an opening 64 through which the video camera 54 can take video extends from the base portion 58. As shown, the pocket 62 includes sidewalls 66 and a top wall 68. The pocket 62, sidewalls 66 and top wall 68 are dimensioned to receive the video camera 54. As best seen in FIG. 8, the body molding member 56 includes a recessed area 70 with threaded extensions 72 for mounting the camera assembly 52 to the roof 46 of the cab 12. Within the pocket 62, there may be one or more openings 74 for receiving fasteners to mount the video camera 54 to the body molding member 56. Depending on the circumstances, the body molding member 56 may be formed from a unitary member, such as molded plastic.

Figure 9:
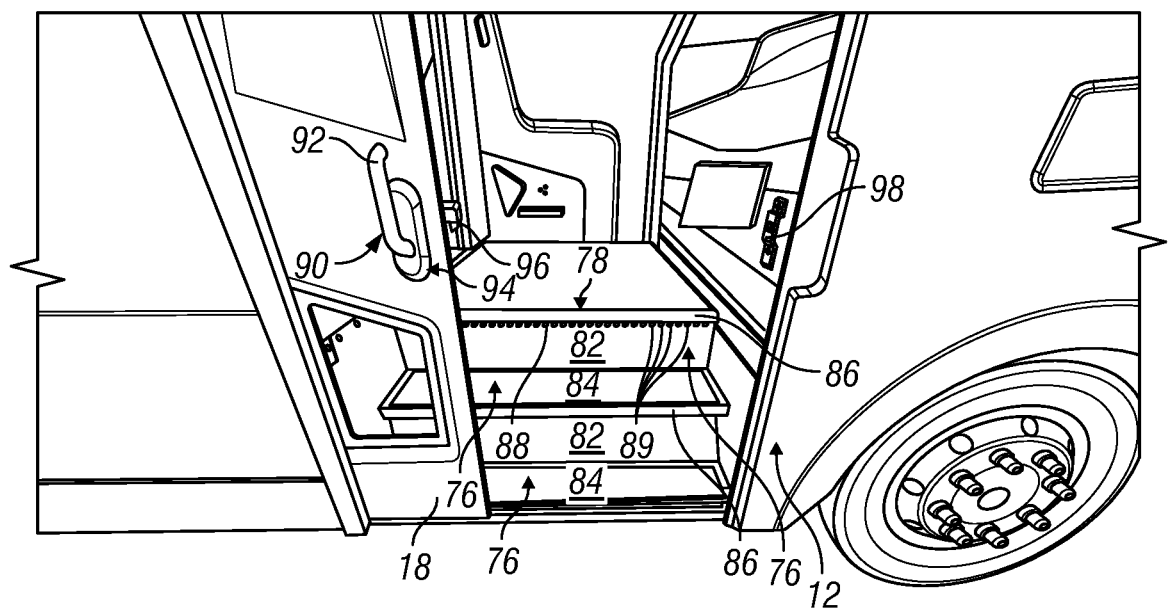
FIG. 9 is a side partial view of the passenger door in an partially open position to expose, among other things, a stair-mounted light strand.

Referring to FIG. 9, the passenger side of the delivery vehicle 10 is shown. In the embodiment shown, the driver or passenger can enter the cab portion 12 by opening the passenger door 18 and climbing up one or more steps 76 to reach the floor 78 of the cab portion 12. From this position, the driver could step over onto the driver seat 80 and drive the delivery vehicle 10. The driver could also enter the rear cargo area 14 through the bulkhead door 22. When delivering packages, for example, the driver may enter the rear storage area 14 through the bulkhead door 22 to find a package to be delivered and then walk down the steps to the delivery location.

In the embodiment shown, there are a plurality of steps including a riser portion 82, a tread portion 84 and a nosing portion 86 that extends from the tread portion 84 over the respective riser portion 82. As shown, the top riser portion 82 includes a light string 88 with a plurality of lights 89 that illuminate the steps 76 and ingress/egress area adjacent the passenger side door 18. In the embodiment shown, the light string 88 includes over 20 lights, which could be LEDs, for purposes of illumination; however, more or less lights in the light string 88 could be provided depending on the circumstances. The position of the light string 88 on the top riser portion 82 underneath the nosing portion 86 provides a safety advantage of illuminating not only the steps 76, but the area on the ground below the steps 76 where the driver or passenger will step down to egress from the delivery vehicle 10.

As shown, the driver or passenger can enter the cab portion 12 from the passenger side by sliding the passenger door 18 to the open position using an outside door handle assembly 90. As shown, the outside door handle assembly 90 includes a handle portion 92 that is configured to actuate a latch assembly 94, such as a latch tongue 96, which is configured to latch the passenger door 18 to a latch plate 98. In some cases, the latch assembly 94 includes a latch tongue 96 on both sides so that the passenger door 18 can be latched in both the closed and open positions. In some such embodiments, the handle portion 92 may be pivoted in a first direction to unlatch the latch assembly 94 when it is latched in the open position and then be pivoted in a second direction to unlatch the latch assembly 94 when it is latched in the closed position.

Figure 10:
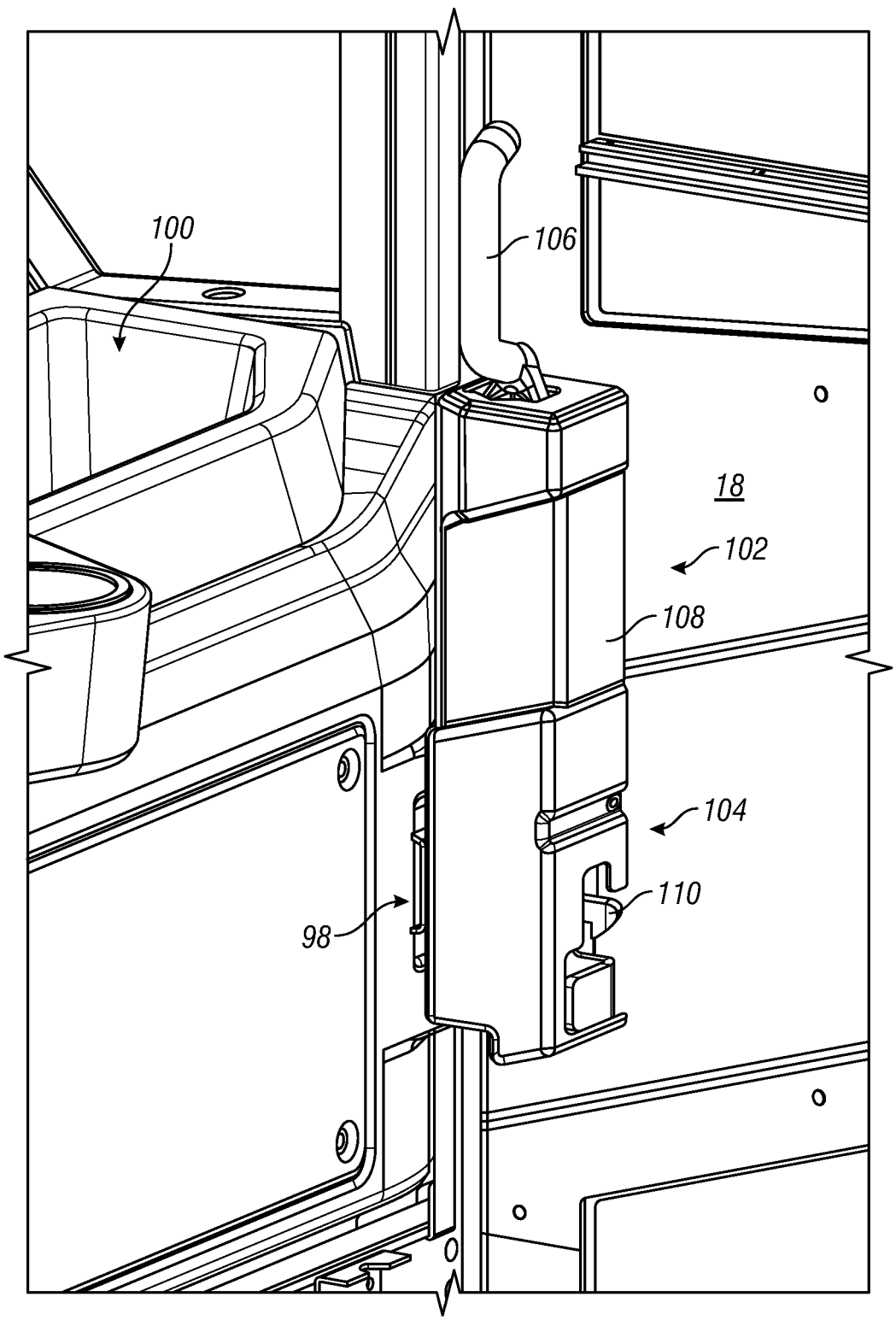
FIG. 10 is a detailed perspective view inside the cab to show, among other things, an example inside door handle assembly for the passenger door according to an embodiment of this disclosure.

Referring now to FIG. 10, there is shown a portion of the cab interior near the passenger door 18. From this view, a portion of the modular dash accessory system 100 can be seen (see FIGS. 28-33). An example inside door handle assembly 102 for moving the passenger door 18 between an open and closed position can also be seen. As shown, the passenger door 18 is in the closed position with a latch assembly 104 of the inside door handle assembly 102 latched with the latch plate 98.

Figure 11:
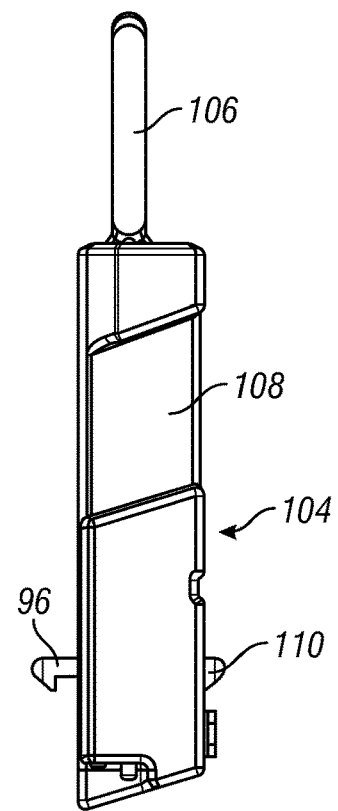
FIG. 11 is a front view of the example passenger inside door handle assembly shown in FIG. 10 in the latched position.
Figure 12:
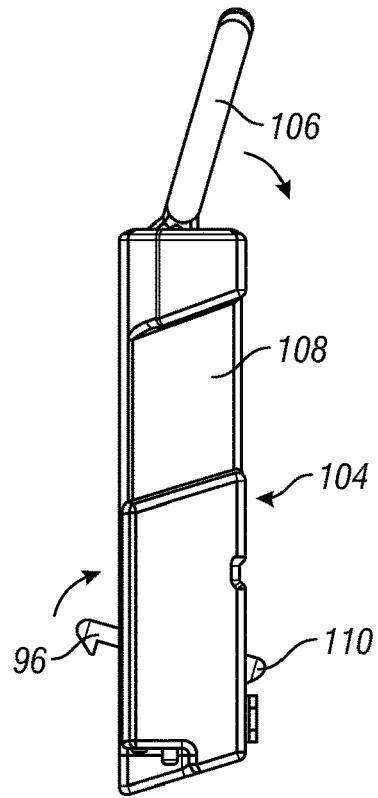
FIG. 12 is a front view of the example passenger inside door handle assembly shown in FIG. 10 in the unlatched position.
Figure 13:
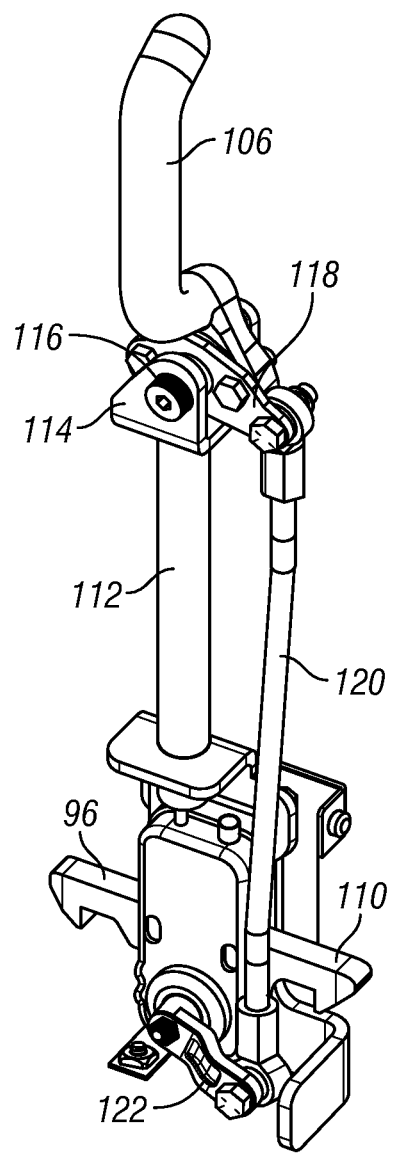
FIG. 13 is a perspective view of the example inside passenger door handle assembly with the housing removed to expose internal components.
Figure 14:
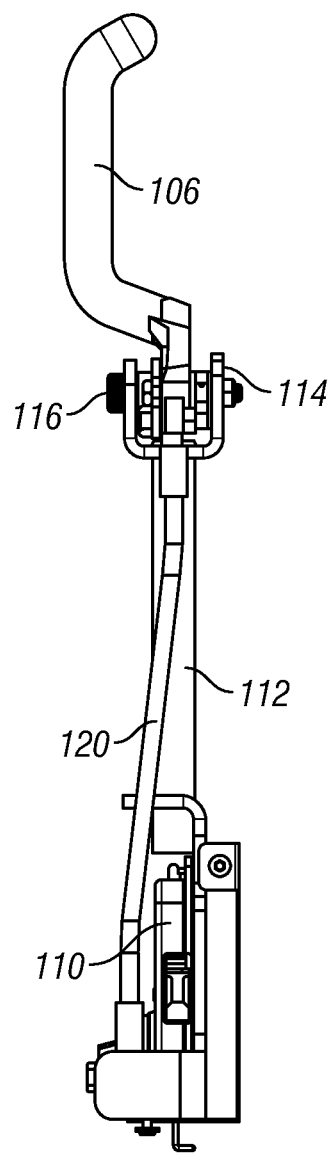
FIG. 14 is a side view of the example inside passenger door handle assembly shown in FIG. 13.
Figure 15:
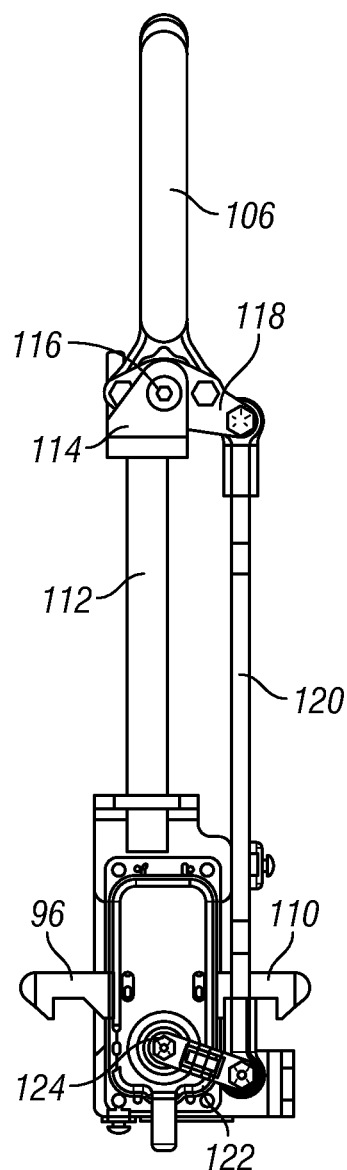
FIG. 15 is a front view of the example inside passenger door handle shown in FIG. 13.
Figure 16:
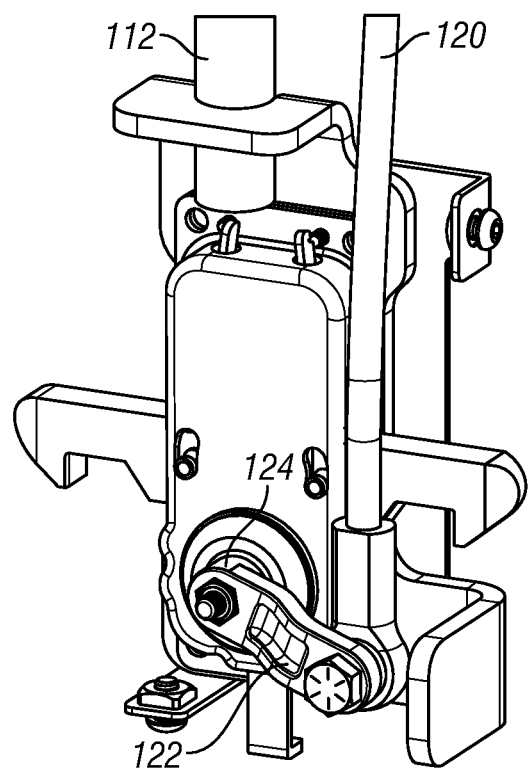
FIG. 16 is a detailed perspective view of the bottom portion of the inside passenger door handle assembly shown in FIG. 13.
Figure 17:
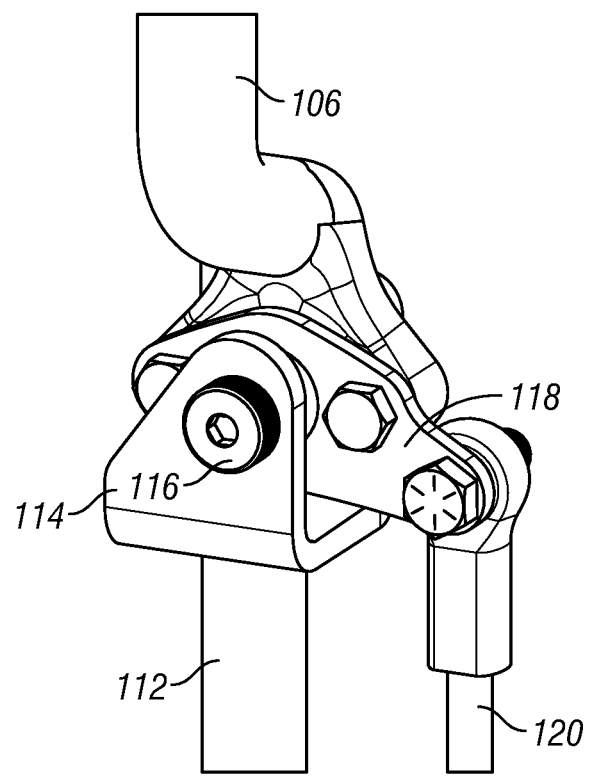
FIG. 17 is a detailed perspective view of the upper portion of the inside passenger door handle assembly shown in FIG. 13.

In the embodiment shown, the inside door handle assembly 102 includes a door handle 106 that is movable to actuate the latch assembly 104 between a latched and unlatched position. For example, as shown in FIG. 11 (latched) and FIG. 12 (unlatched), the door handle 106 may pivot to move between a latched and unlatched position. As shown, pivoting the door handle 106 to the unlatched position moves the latch tongue 96 to the unlatched position. In the latched position, the latch tongue 96 engages the latch plate 98 while in the unlatched position, the latch tongue 96 is moved to clear the latch plate 98. One technical advantage of the inside door handle assembly 102 is that the position of the door handle 106 is elevated above the latch tongue 96 to a position that can be actuated while the user is on the floor 78 of the cab 12. As shown, the door handle 106 for actuating the latch assembly 104 is at a vertical height substantially near or above the dashboard. This allows the driver or passenger to actuate the latch assembly 104 while standing on the cab floor 78 without needing to stoop downward to reach the door handle 106 as is done on existing vehicles.

As shown in FIG. 10, the inside door handle assembly 102 includes a housing 108 to enclose internal components. The housing 108 is mounted to an inside surface of the passenger door 18 so the inside door handle assembly 102 moves concomitant of the passenger door 18. In this example, the latch assembly 94 includes a secondary latch tongue 110 for latching the passenger door 18 in the open position. In some embodiments, the door handle 106 may be pivoted in the opposite direction of that shown in FIG. 12 to move the secondary latch tongue 110 between latched and unlatched positions.

Referring now to FIGS. 13-17, there is shown the inside door handle assembly 102 with the housing 108 removed to expose internal components. As shown, the inside door handle assembly 102 includes a support rod 112 with a first end attached to a bracket 114. The door handle 106 is pivotally connected with the bracket 114. As shown, the door handle 106 pivots about a pivot pin 116 and is connected to a connector plate 118 such that pivoting of the door handle 106 pivots the connector plate 118. In the embodiment shown, an end of the connector plate 118 is attached to a connecting rod 120. An opposing end of the connecting rod 120 is connected with a latch actuator plate 122, which is connected with a spindle 124 to rotate the latch tongues 96, 110 to move them to their respective latched/unlatched positions depending on the direction the door handle 106 is pivoted. If the door handle 106 is pivoted in a first direction, this will move the latch tongue 96 to an unlatched position whereas if the door handle 106 is pivoted in an opposing second direction, this will move the latch tongue 110 to an unlatched position.

Figure 18:
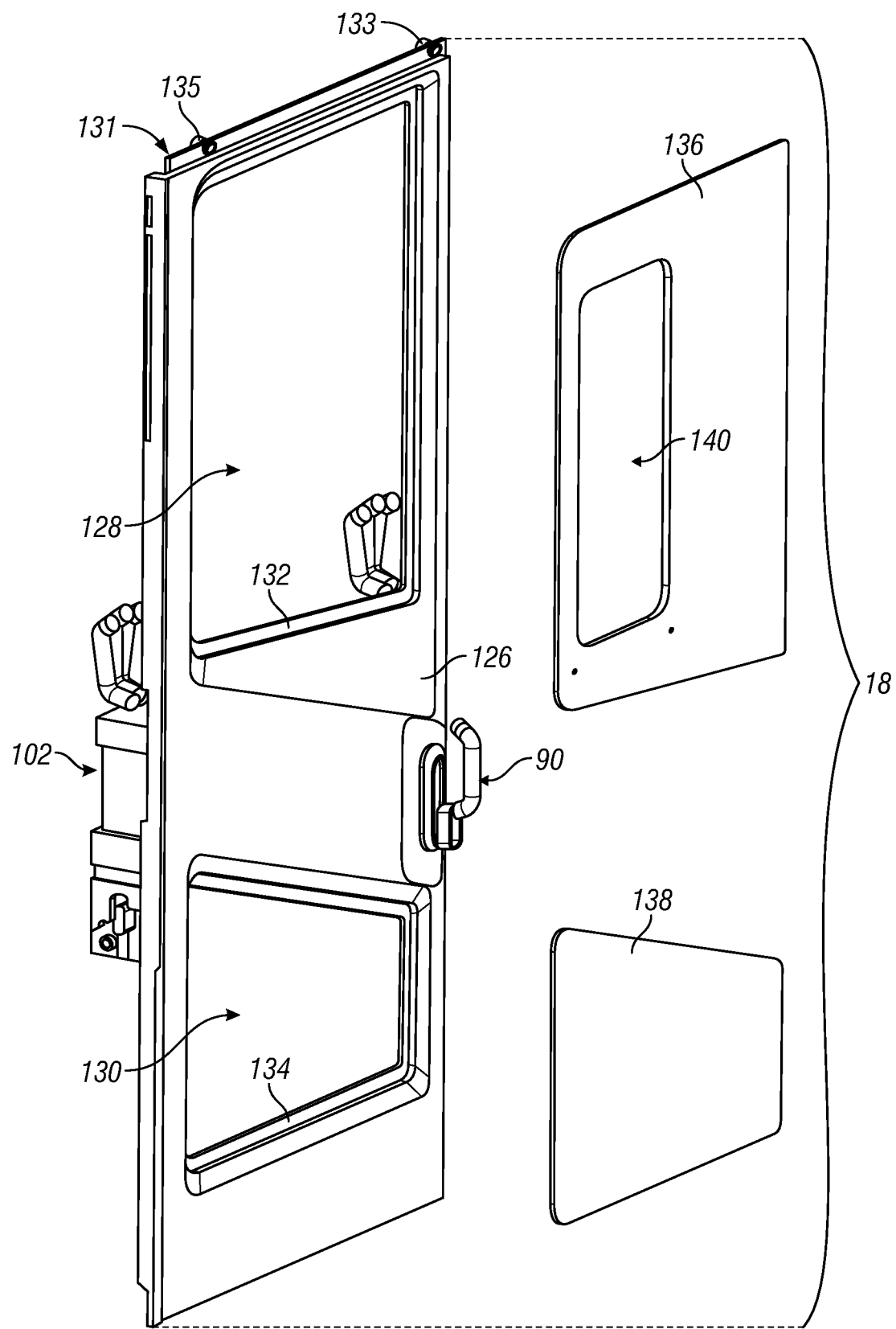
FIG. 18 is an exploded view of an example passenger door assembly according to an embodiment of this disclosure.

FIG. 18 illustrates an embodiment of a passenger door 18. In the embodiment shown, the passenger door 18 includes a door frame 126 with an upper opening 128 and a lower opening 130. A roller assembly 131 with a first roller 133 and a second roller 135 is mounted to the top of the door frame 126 in the example shown. Surrounding the perimeter of the upper opening 128 and lower opening 130 is an upper recessed ledge 132 and a lower recessed ledge 134, respectively. As shown, there is an upper glass pane 136 that is configured to be received by the upper recessed ledge 132 and a lower glass pane 138 that is configured to be received by the lower recessed ledge 134. Although to glass panes 136, 138 are shown for purposes of example, a single glass pane or more than two glass panes could be used depending upon the circumstances. In some embodiment, other types of transparent or translucent material could be used instead of glass, such as Plexiglas or other materials.

In some embodiments, the upper glass pane 136 may be bonded with the upper recessed ledge 132 and the lower glass pane 138 may be bonded with the lower recessed ledge 134. For example, a bonding adhesive may be used to bond the glass panes 136, 138 to their respective ledges 132, 134. By way of example, a bonding adhesive similar to that used to bond a windshield to a frame of a vehicle could be used. By bonding the glass panes 136, 138 to the door frame 126, this eliminates the fasteners and trim pieces used in existing vehicles that may tend to create leaks within the cab.

Figure 19:
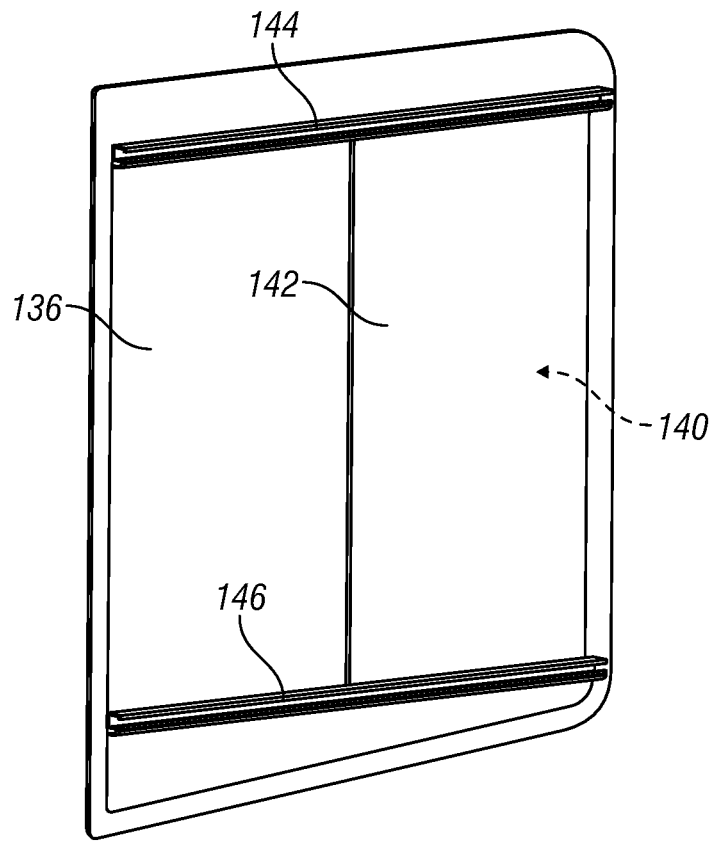
FIG. 19 is a rear view of an example upper window assembly for the passenger door according to an embodiment of this disclosure.
Figure 20:
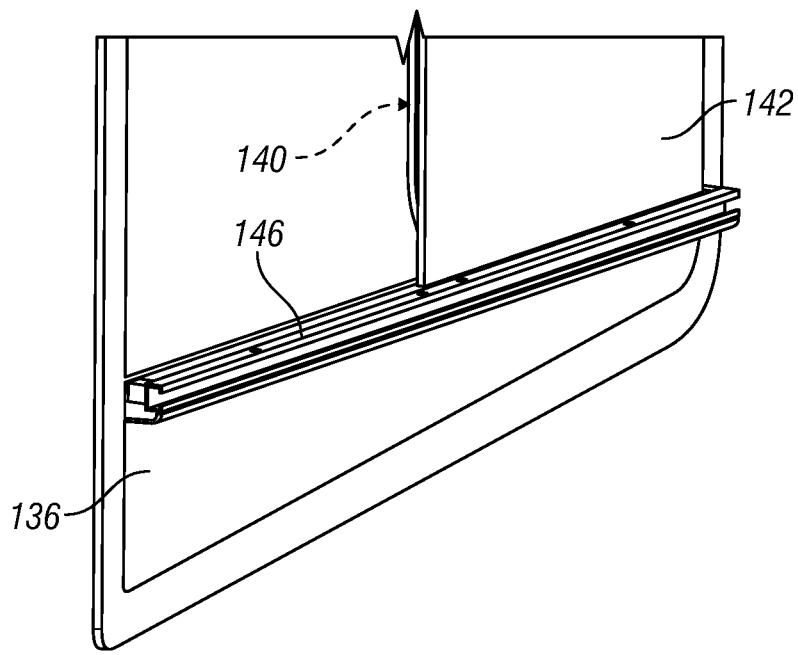
FIG. 20 is a detailed perspective view of the example upper window assembly for the passenger door showing the track for the sliding window according to an embodiment of this disclosure.
Figure 21:
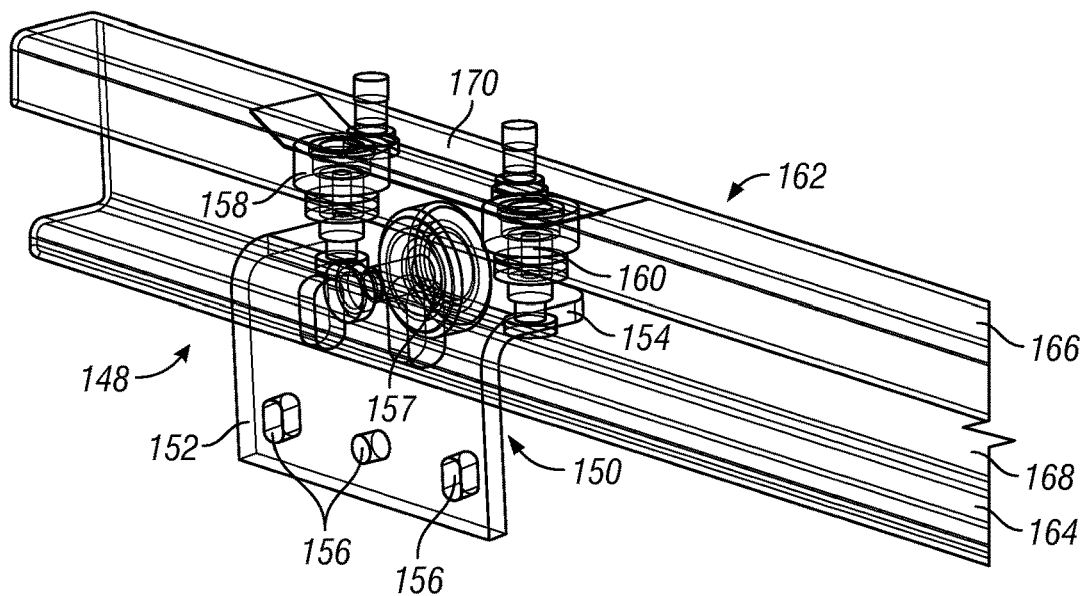
FIG. 21 is a perspective view of an example track assembly and roller assembly for sliding the passenger door according to an embodiment of this disclosure.
Figure 22:
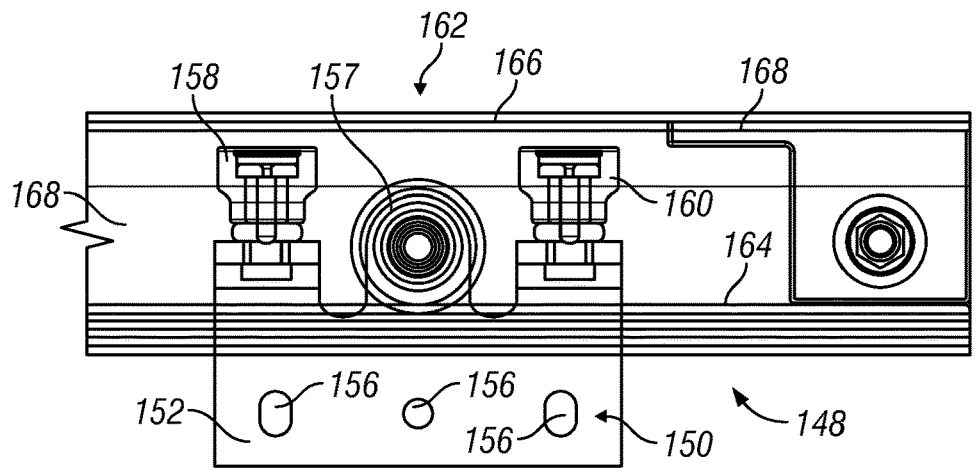
FIGS. 22-23 are side cross-sectional views showing a portion of the roller assembly moving towards and being captured by a height limited portion of the track assembly according to an embodiment of this disclosure.

In the embodiment shown, the upper glass pane 136 includes an opening 140. As shown in FIG. 19, a sliding glass window 142 is journaled between an upper track 144 and a lower track 146 is slidable between a closed position in which the sliding glass window 142 is aligned with the opening 140 and an open position in which the sliding glass window 142 is not aligned with the opening 140. In some embodiments, the tracks 144, 146 are bonded to the upper glass pane 136.

FIGS. 21-25 illustrate an embodiment of a slide assembly 148 for the passenger door 18. As discussed herein, the slide assembly 148 is configured to wedge internal components together when the passenger door 18 is in the closed position, which dampens bouncing of the door 18 in transit, and thereby reduces rattling noises coming from the door 18 while the vehicle 10 is in motion. In the embodiment shown, there is a L-shaped bracket 150 with a first leg 152 and a second leg 154. As shown, the first leg 152 extends approximately along a vertical axis and is attachable to a top portion of the passenger door 18, such as with fasteners through openings 156 in the first leg 152. In the embodiment shown, the second leg 154 extends approximately along a horizontal axis and has a wheel 157 pivotally coupled with the bracket 150. A first extension 158 and a second extension 160 extend from the second leg 154.

In the embodiment shown, the slide assembly 148 includes a track 162 with a lower rail 164 and an upper rail 166 which both extend approximately along a horizontal axis and are connected with a base 168. As shown, the wheel 157 rides on the lower rail 164. The extensions 158, 160 are configured to engage with one or more damping members extending into their path from the upper rail 166 when the passenger door 18 is in the closed position, thereby limiting vertical movement of the passenger door. The damping members may be formed from a frictional material, such as rubber, or other damping material that impacts force on the extensions 158, 160 to wedge the extensions 158, 160 in place to limit vertical movement of the door 18 when in the closed position.

Figure 23:
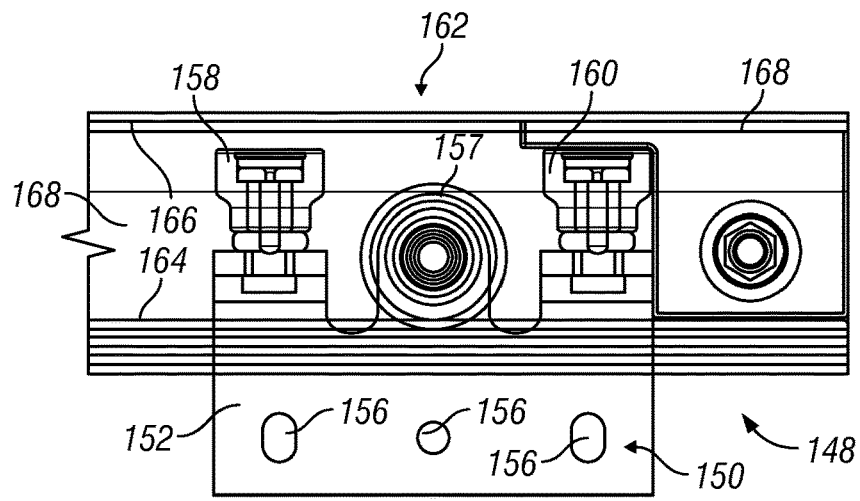
Figure 24:
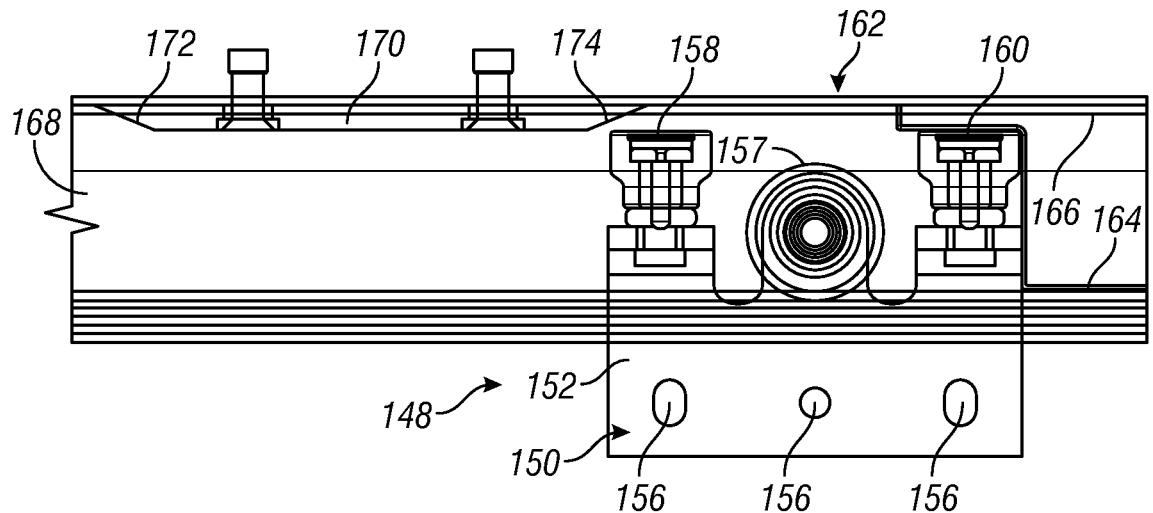
FIGS. 24-25 are side cross-sectional views showing a portion of the roller assembly moving towards and being captured by a ramp portion of the track assembly according to an embodiment of this disclosure.
Figure 25:
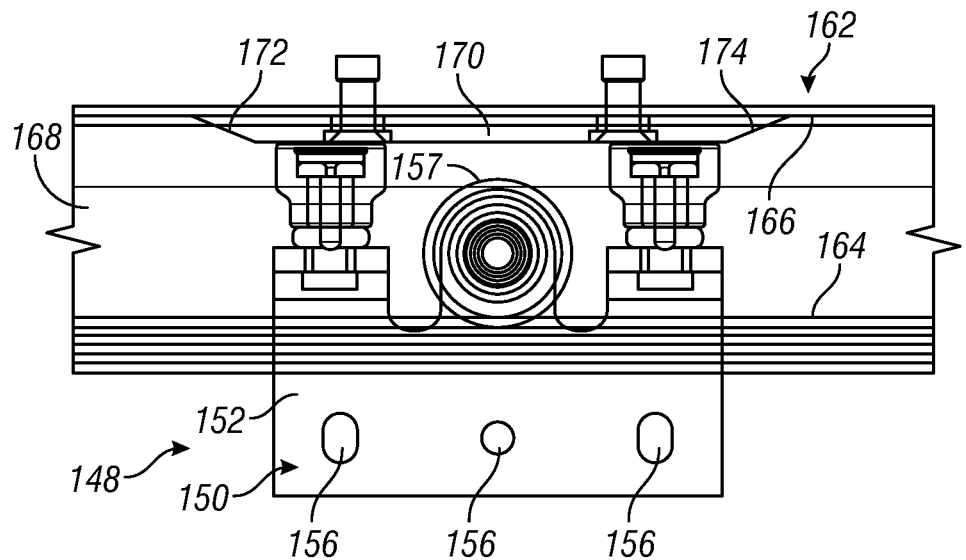

As shown, a height limiter 168 extends from the upper rail 166 at one end of the track 162, which may engage with at least one extension 160 (FIG. 23). Additionally, a ramp 170 extends from the upper rail 166. As shown, the ramp 170 includes a first sloped surface 172 and a second sloped surface 174. In this example, the width of the ramp 170 spans approximately the width between the extensions 158, 160.

The ramp 170 is spatially arranged on the track 162 so that the extensions 158, 160 are engaged with the ramp 170 when the passenger door 18 is in the closed position (FIG. 25), but not when the passenger door 18 is out of the closed position. In this manner, the engagement of the extensions 158, 160 with the ramp 170 prevents (or dampens) vertical movement of the passenger door 18 during transit. This provides a technical advantage by wedging the extensions 158, 160 together with the ramp 170 when the passenger door 18 is in the closed position, which prevents the passenger door 18 from bouncing up and down while the vehicle 10 is in transit, thereby limiting a rattling noise coming from the door 18.

Figure 26:
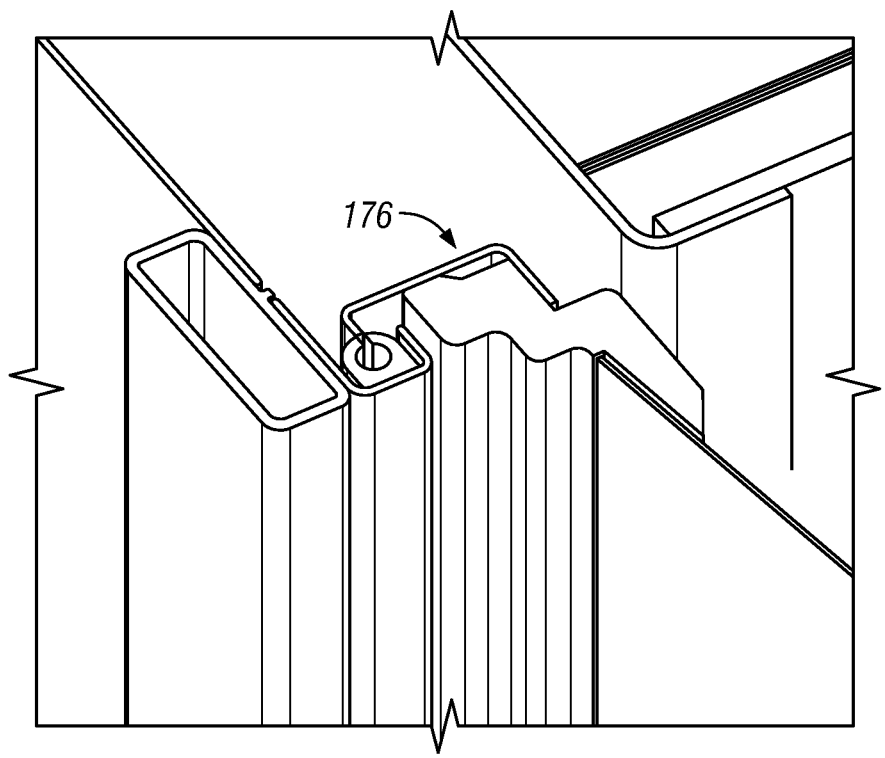
FIG. 26-27 are perspective and bottom views of the passenger door showing sealing portions near the rear portion.
Figure 27:
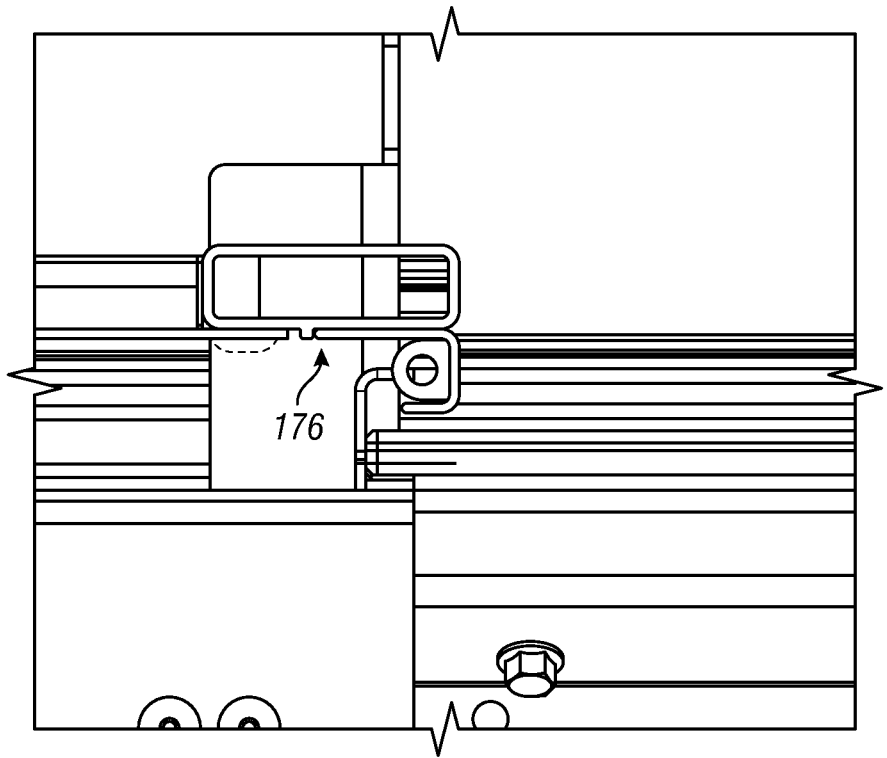

FIGS. 26 and 27 illustrate an example embodiment of seal 176 for the passenger door 18. In the embodiment shown, the seal 176 prevents water leakage near the rear portion of the passenger door 18.

Figure 28:
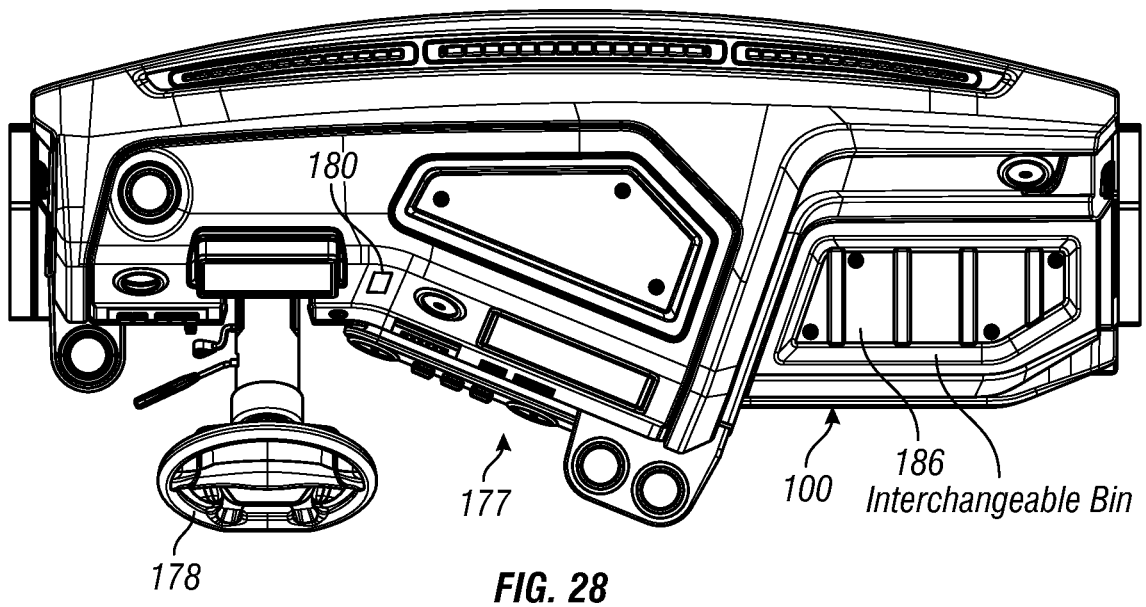
FIG. 28 is a top view of an example dashboard with a modular dashboard accessory system according to an embodiment of this disclosure.
Figure 29:
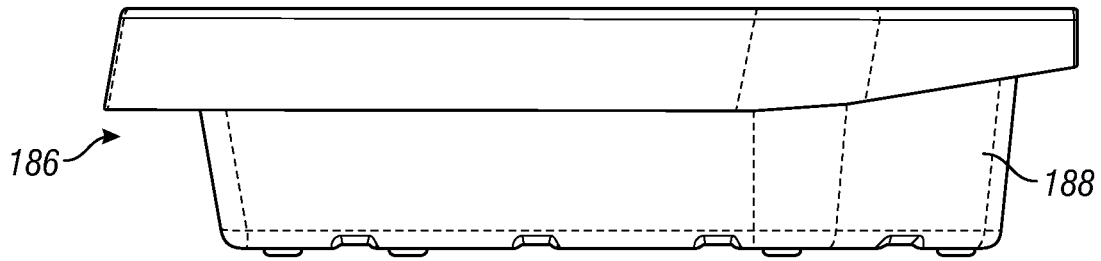
FIG. 29 is a front view of an example bin that can be received in a modular accessory retention portion of the dashboard according to an embodiment of this disclosure.
Figure 30:
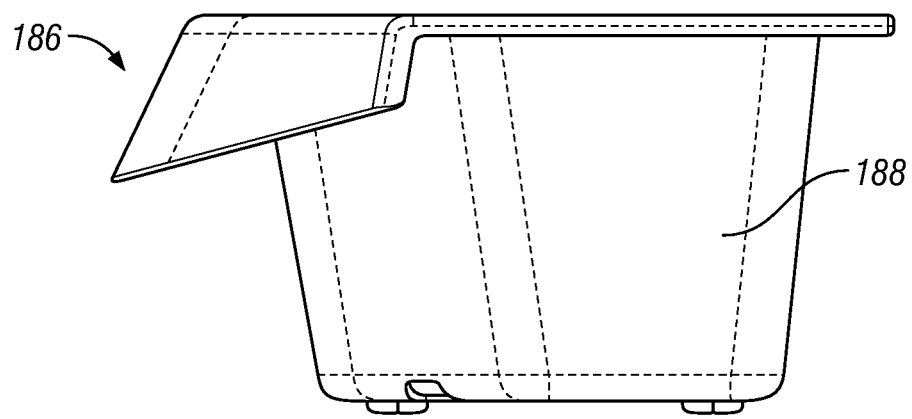
FIG. 30 is a side view of the example bin shown in FIG. 29.
Figure 31:
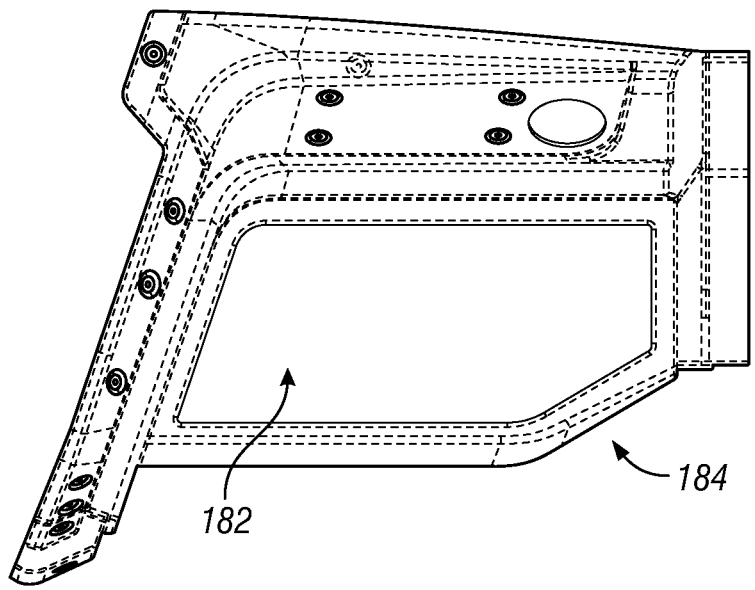
FIG. 31 is a top view of a portion of the dashboard showing an example modular accessory retention portion with the bin removed according to an embodiment of this disclosure.
Figure 32:
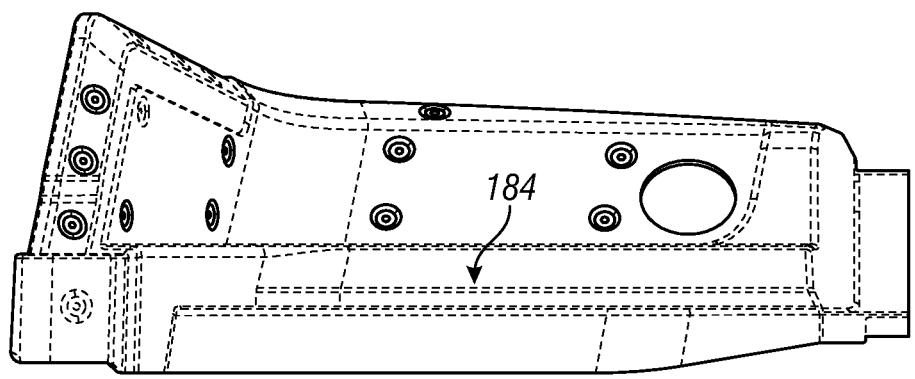
FIG. 32 is a front view of the example dashboard portion shown in FIG. 31.
Figure 33:
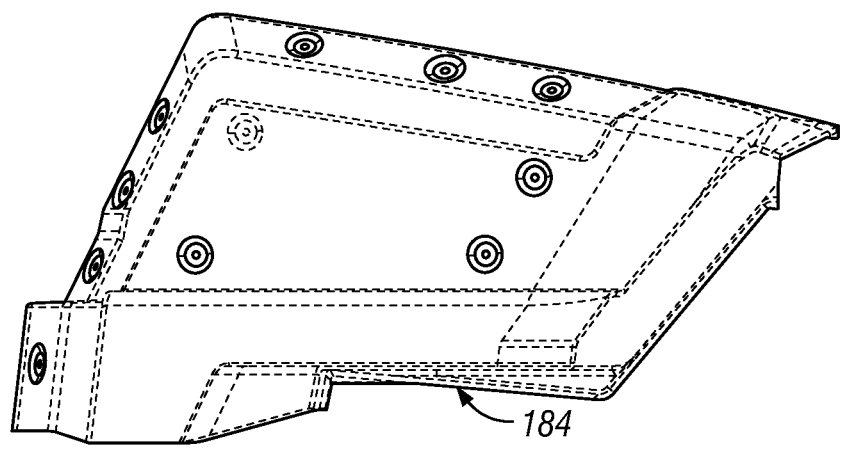
FIG. 33 is a side view of the example dashboard portion shown in FIG. 31.

FIG. 28 illustrates an example dashboard 177 that may be used in conjunction with the vehicle 10. As can be seen, the example dashboard 177 includes a steering wheel 178 that the driver may use to steer the vehicle 10. In the example shown, there is a delivery mode button 180 that may be activated by the driver to initiate parcel delivery mode, as discussed herein (see FIG. 45). Although this example shows the delivery mode button 180 as a physical button, the delivery mode button 180 could be activated with a switch, lever, voice, touchscreen, etc.

The example dashboard 177 includes the modular dash accessory system 100, which is on the passenger side in this embodiment; for example, in the embodiment shown, the modular dash accessory system 100 can be reached by the passenger seat. As shown, the modular dash accessory system 100 is configured to interchangeably receive a plurality of different accessories, including but not limited to, a bin, work table, bucket, work tray, cooler with a drain plug, glove box, lockable bin, clipboard, and/or other accessory device. In some of the embodiments, the accessories may include a lower portion that is configured to be received in an opening 182 (FIG. 31) of a modular accessory retention portion 184. There could be a variety of retention mechanisms employed by the modular accessory retention portion 184 to interchangeably retain the accessories. In some embodiments, the lower portion of the accessories are sized and shaped to be received by the opening 182. This has the technical advantage of allowing flexibility in what is installed in the passenger area of the dashboard 177 to pick between a variety of different accessories. In the embodiment shown, the modular accessory shown for purposes of example is a bin 186, but as mentioned herein, could be a variety of other accessories that could be interchangeably received by the modular accessory retention portion 184. As shown, the bin 186 includes a lower portion 188 sized and shaped corresponding to the size and shape of the opening 182 of the modular accessory retention portion 184.

In some embodiments, the rear cargo door 20 may be automatically controlled between an open position and a closed position. For example, the rear cargo door 20 could be actuated electronically remotely by the driver to save time in delivering delivery items. Depending on the circumstances, there could be a variety of manners by which the rear cargo door 20 could be actuated, such as with a button on the dashboard, keyfob, proximity sensor, or other electronic actuation device.

Referring now to FIGS. 34-37, in some embodiments the rear cargo door 20 is a roll up door. For example, the rear cargo door 20 could be a Rom Roll Up Door offered by Rom of Belton, Mo. Such a door rolls up into a reel when in the open position. As shown in FIGS. 34 and 35, the example distance between floor and roof of the rear storage area 14 when the rear cargo door 20 is in the closed position is approximately 86.22 inches in this example while as shown in FIGS. 36 and 37 with the door in the closed position, the distance between the floor and the rear cargo door 200 (rolled into a reel in the open position) is approximately 75.54 inches in this example. This provides increased head room within the rear cargo area compared to existing roll up doors that operate similar to a garage door and intrude on overhead space in the open position. Additionally, this provides a technical advantage of providing more clearance for packages in the storage systems, such as shelving.

Figure 38:
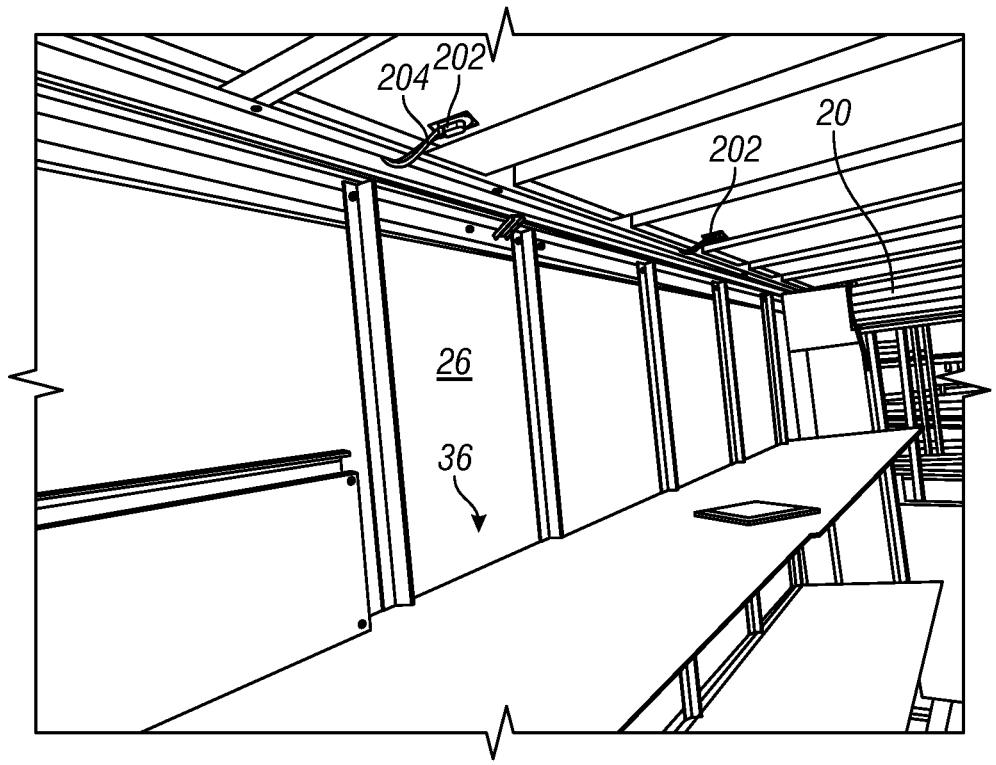
FIG. 38 is a perspective view within the rear cargo area showing a plurality of connections with roof-mounted solar panels.
Figure 39:
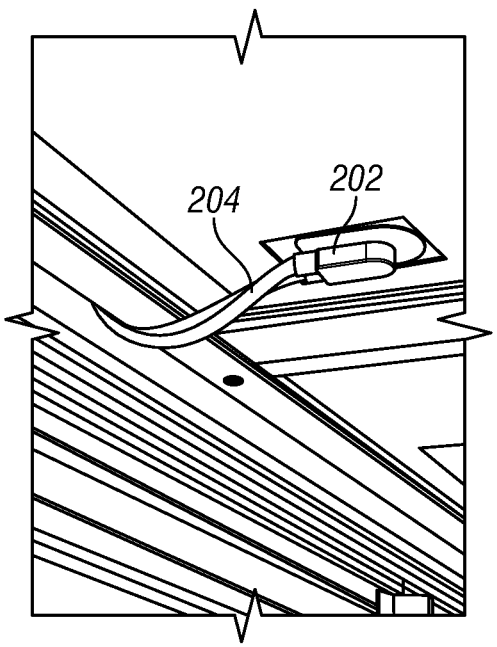
FIG. 39 is a detailed view of a connection with a roof-mounted solar panel.

Referring to FIGS. 38 and 39, there is shown power connections 202 between one or more solar panels 50 mounted on the roof 30 and a power harness and/or energy consuming devices within the vehicle 10. If the vehicle 10 is an electric vehicle (EV), for example, the power connections 202 may electrically connect the solar panels 50 to the batteries. As shown, the power connections 202 extend through the roof 30 of the rear storage area 14 and include a cable 204, which connects to one or more electric devices.

Figure 40:
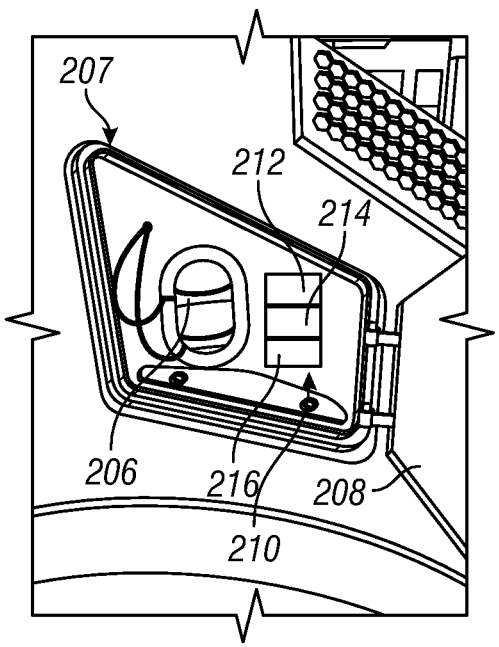
FIG. 40 is an example charge port for charging the delivery vehicle and integral charge remaining gauge according to an embodiment of this disclosure.

FIG. 40 illustrates an embodiment in which the delivery vehicle 10 is an EV and includes an example charge port 206 for charging the batteries of the EV. In the example shown, the charge port 206 is in a recessed area 207 that is protected under a charging door 208, which is open in FIG. 40. As shown, a charge level gauge 210 is integral with the recessed 207. The charge level gauge 210 could be embodied in a variety of manners, such as a battery percentage, estimated miles remaining, a bar graph, etc. As shown, the charge level gauge 210 includes three color-coded levels, green level 212, a yellow level 214, and a red level 216, which could each be assigned charge level ranges. Of course, more or fewer levels could be provided depending on the circumstances.

Referring to FIGS. 41 and 42, there is shown the rear cargo area 20 with a plurality of shelving assemblies 36 according to an embodiment of this disclosure. In the embodiment shown, each shelving assembly 36 includes one or more shelves 220 formed from a composite material, which reduces weight. The shelves 220 are connected with one or more gussets 222; for example, in some embodiments, the shelves 220 may be connected to the gussets 222 with adhesive; embodiments are also contemplated in which one or more fasteners could connect the shelves 220 to the gussets 222. As shown, the gussets 222 are pivotally connected with a plurality of wall-mounted rails 224 and may move between an extended position (FIG. 41) and a retracted position (FIG. 42). In the embodiment shown, the shelves 220 includes slots 226 corresponding to the rails 224 to allow the shelves 220 to retract. In some embodiments, the rails 224 includes multiple opening 228 for providing vertical adjustment to the shelves 220.

Figure 43:
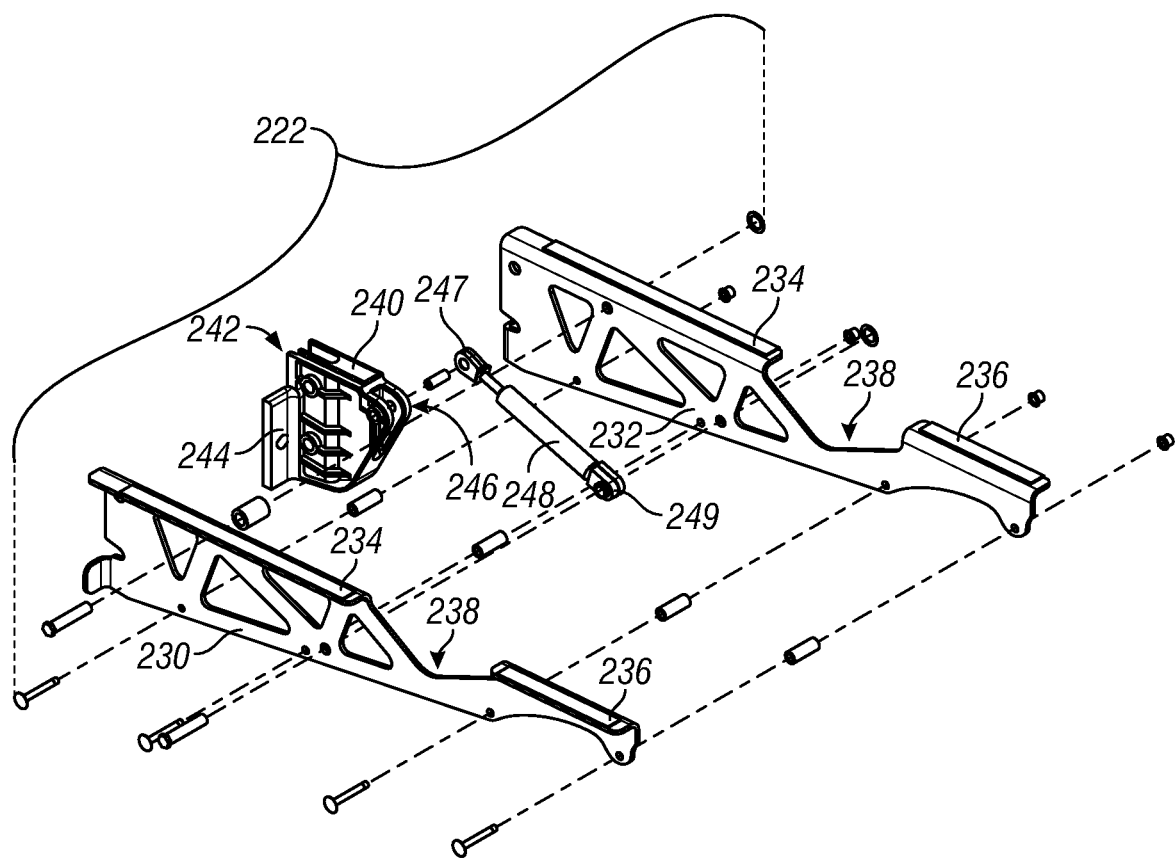
FIG. 43 is an exploded view of an example shelving gusset according to an embodiment of this disclosure.
Figure 44:
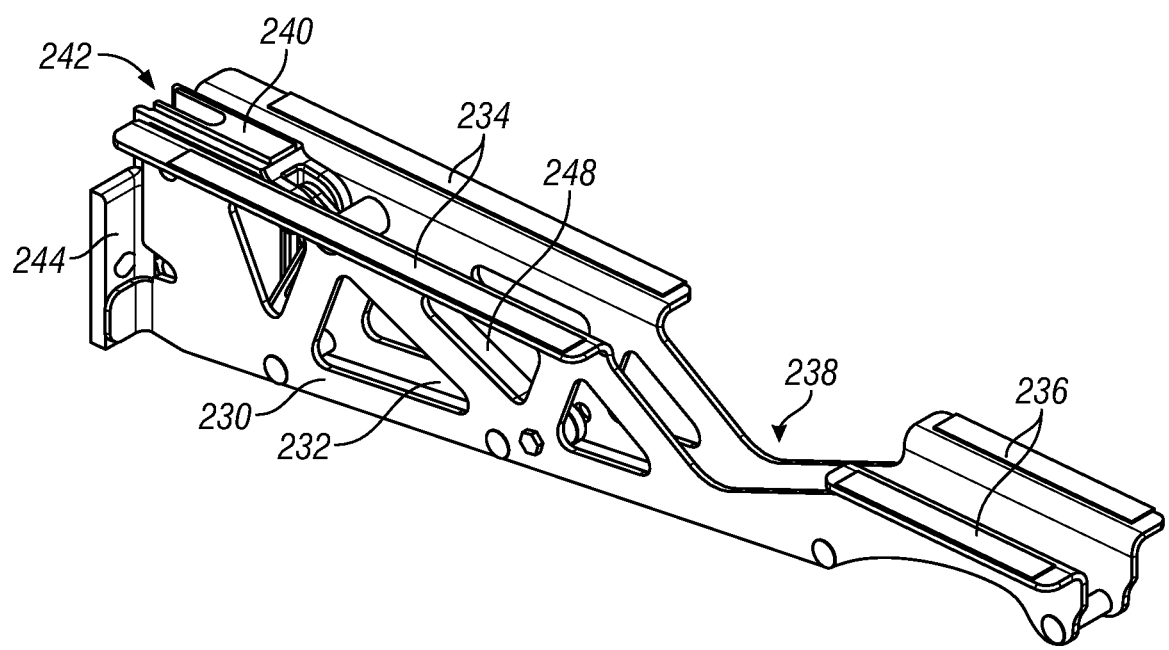
FIG. 44 is a perspective view of the example shelving gusset shown in FIG. 43 in an assembled state.

FIGS. 43 and 44 illustrates the gusset 222 according to an embodiment this disclosure. As shown, the gusset 222 includes a first support member 230 and a second support member 232. In the embodiment shown, the support members 230, 232 include a first mounting surface 234 and a second mounting surface 236 for mounting the shelves 220 to the gusset 222. For example, the mounting surfaces 234, 236 may include an adhesive strip for mounting the shelves 220. As shown, there is a notch 238 formed in the support members 230, 232 that is configured to receive a supplemental structural support, such as a beam (not shown) extending transversely between the gussets 222. In the embodiment shown, the support members 230, 232 pivotally connect with a rail connection member 240, which allows the gusset 222 to move between extended and retracted positions. The rail connection member 240 includes a slot 242 for receiving a portion of a rail 224 and flanges 244 for mounting the rail connection member 240 to the wall. As shown, the rail connection member 240 also includes a slot 246 for receiving a first end 247 of a strut 248 and the second end 249 of the strut 248 pivotally connects with the support members 230, 232, which allows the gussets 222 to maintain a retracted position due to urging of the strut 248. In some cases, one or more of the fasteners may be pin and collar fasteners, such as Magnagrip fasteners, and/or other fasteners; in some embodiments, one or more components of the gussets 222 may be welded.

Figure 45:
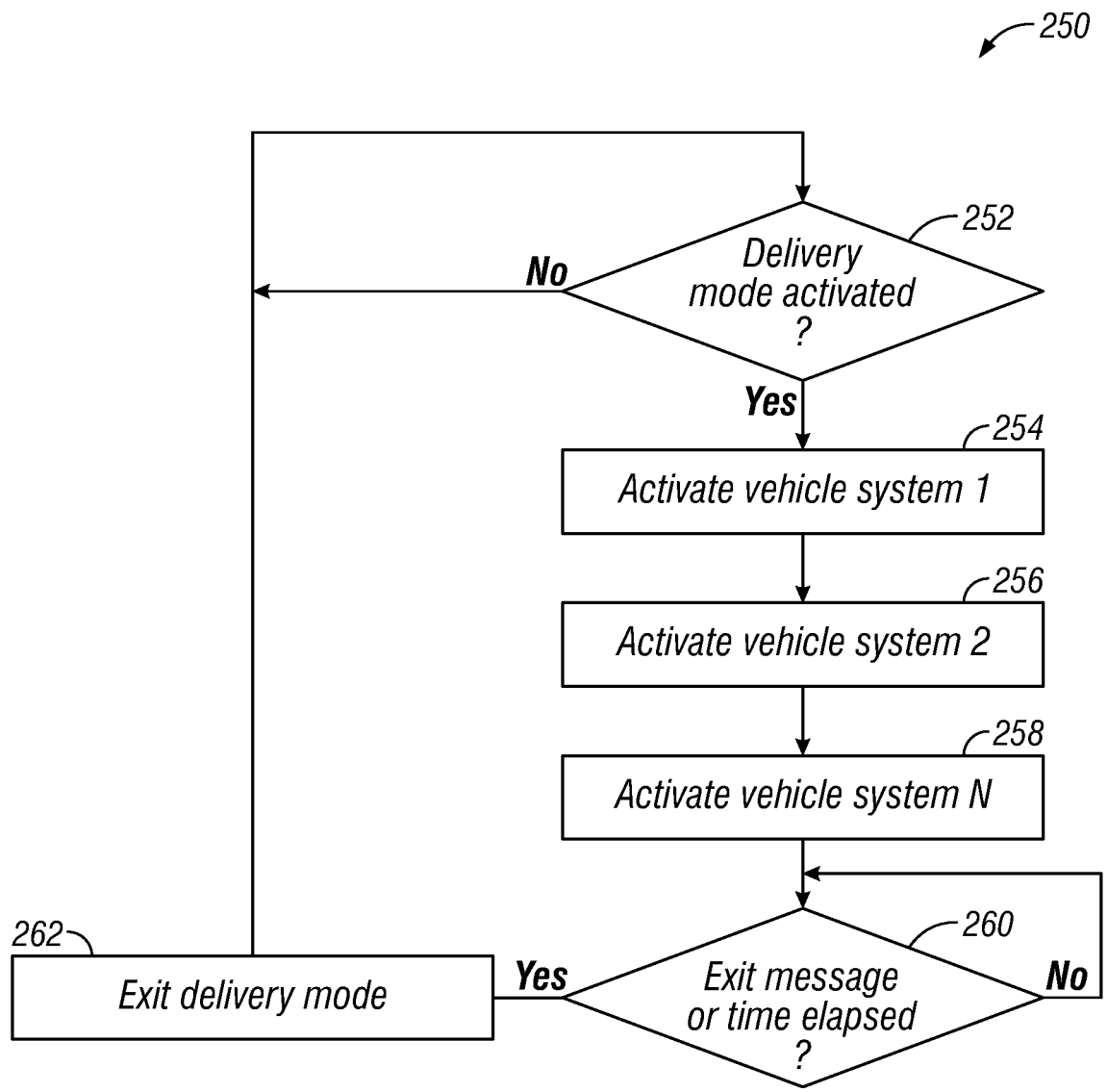
FIG. 45 is a flow chart showing example steps that may be performed during the vehicle's delivery mode according to an embodiment of this disclosure.

Referring to FIG. 45, there is shown a simplified flow diagram illustrating one or more steps that may be performed in delivery mode. As discussed herein, the delivery mode may be activated by the driver via a button 80 on the dashboard, keyfob, voice control, or other electronic triggering device. Once delivery mode has been activated, multiple vehicle systems could be activated that are needed when a package is being delivered. For example, entering delivery mode may activate hazard lights, open the passenger door, bulkhead door and/or the passenger door. In some cases, some of the systems may be on a timer; for example, the bulkhead door may be on a timer to stay open only for 30 seconds and then will automatically close. This provides a technical advantage by saving time instead of manually activating each system; additionally, this provides a safety feature of consistently having all desired safety mechanisms activated during a delivery, such as hazard lights. The delivery mode cannot be tied merely to parking the vehicle 10 because the systems the driver may activate during a delivery are different from those when merely parked, which is why a separate button or voice control activation is provided for delivery mode. In the example flow shown in FIG. 45, the method 250 beings by monitoring whether the delivery mode has been activated (block 252). If delivery mode is activated, multiple vehicle systems, such as hazard lights, opening doors, etc., are activated (blocks 254, 256, 258). In some cases, the delivery mode may deactivate some systems depending on the circumstances. In some embodiments, the delivery mode could be customizable to configure which vehicle systems are activated/deactivated during delivery. The system then monitors whether a timer has elapsed or delivery mode is ended (e.g., by pushing a button on the keyfob or dashboard) (block 260). When this happens, delivery mode will end (block 262).

The invention claimed is:

1. A delivery vehicle comprising:
 a vehicle body comprising a cab portion and a rear cargo portion, wherein the cab portion includes a driver's side with a driver's door for entering and exiting the cab portion on the driver's side and a passenger's side with a passenger's door for entering and exiting the cab portion from the passenger's side, wherein the cab portion includes a floor extending between the driver's side and the passenger's side and one or more steps adjacent the passenger's door;
 a latch assembly moveable between a latched position that latches the passenger's door and an unlatched position that unlatches the passenger's door;
 an inside passenger door handle extending within the cab portion and configured to actuate the latch assembly between the latched position and the unlatched position;
 wherein at least a portion of the inside passenger door handle extends into the cab portion to be reachable while on the floor without climbing down the one or more steps adjacent the passenger's door; and
 wherein the latch assembly comprises:
  a housing mountable to the passenger's door;
  a support rod with a first end connected with a bracket and a second end pivotally connected with the inside passenger door handle;
  a connector plate pivotally connected to the inside passenger door handle;
  a connecting rod having a first end connected with the connector plate and an opposing end connected to a latch actuator plate; and
  a spindle configured to move a latch tongue between a latched position and an unlatched position, wherein the spindle is configured to move the latch tongue to the latched position in response to the inside passenger door handle pivoting in a first direction and to move the latch tongue to the unlatched position in response to the inside passenger door handle pivoting in a second direction.

2. The delivery vehicle of claim 1, wherein at least a portion of the inside passenger door handle is elevated above the one or more steps adjacent the passenger's door.

3. The delivery vehicle of claim 2, wherein the cab portion includes a dashboard and at least a portion of the inside passenger door handle is elevated at or above the dashboard.

4. The delivery vehicle of claim 3, wherein at least a portion of the inside passenger door handle has an elongated shape that is substantially vertically oriented.

5. The delivery vehicle of claim 1, wherein the inside passenger door handle is mounted to the passenger's door so the inside passenger door handle moves concomitant with the passenger's door.

6. The delivery vehicle of claim 1, wherein the inside passenger door handle pivots in a first direction to actuate the latch assembly.

7. The delivery vehicle of claim 6, wherein the latch assembly includes a secondary latch configured to latch the passenger's door in an open position, wherein the inside passenger door handle pivots in a second, opposing direction to actuate the secondary latch.

8. The delivery vehicle of claim 7, wherein the passenger's door includes at least one window formed from a transparent or translucent material, wherein the passenger's door defines a ledge surrounding the at least one window, wherein the at least one window is bonded to the ledge.

9. The delivery vehicle of claim 1, further comprising a slide assembly connected with the passenger's door to allow the passenger's door to slide between an open position and a closed position.

10. The delivery vehicle of claim 9, wherein the slide assembly comprises (i) a track with a lower rail and an upper rail that extend approximately along a horizontal axis, (ii) a wheel that rides on the lower rail; and (iii) a bracket movable with the wheel that is connected to the passenger's door.

11. The delivery vehicle of claim 10, wherein the bracket includes one or more extensions extending between the lower rail and the upper rail.

12. The delivery vehicle of claim 11, wherein the slide assembly includes dampening members extending into a path of the one or more extensions to limit vertical movement of the passenger's door when in the closed position.

13. A delivery vehicle comprising:
a vehicle body comprising a cab portion and a rear cargo portion with a bulkhead door therebetween, wherein the cab portion includes a driver's side and a passenger's side;
a sliding passenger door for entering and exiting the passenger's side of the cab;
a latch assembly moveable between a latched position that latches the passenger door in a closed position and an unlatched position that unlatches the passenger door;
an inside passenger door handle extending within the cab portion and configured to actuate the latch assembly between the latched position and the unlatched position;
wherein the cab portion includes a dashboard and at least a portion of the inside passenger door handle is positioned vertically at or above the dashboard; and
wherein the latch assembly comprises:
a housing mountable to the passenger's door;
a support rod with a first end connected with a bracket and a second end pivotally connected with the inside passenger door handle;
a connector plate pivotally connected to the inside passenger door handle;
a connecting rod having a first end connected with the connector plate and an opposing end connected to a latch actuator plate; and
a spindle configured to move a latch tongue between a latched position and an unlatched position, wherein the spindle is configured to move the latch tongue to the latched position in response to the inside passenger door handle pivoting in a first direction and to move the latch tongue to the unlatched position in response to the inside passenger door handle pivoting in a second direction.

14. The delivery vehicle of claim 13, wherein at least a portion of the inside passenger door handle has an elongated shape that is substantially vertically oriented.

15. The delivery vehicle of claim 14, wherein the inside passenger door handle is mounted to the sliding passenger door so the inside passenger door handle moves concomitant with the passenger door.

16. The delivery vehicle of claim 15, wherein the inside passenger door handle pivots in a first direction to actuate the latch assembly.

17. The delivery vehicle of claim 16, wherein the latch assembly includes a secondary latch configured to latch the passenger door in an open position, wherein the inside passenger door handle pivots in a second, opposing direction to actuate the secondary latch.

18. The delivery vehicle of claim 17, wherein the passenger door includes at least one window formed from a transparent or translucent material, wherein the passenger door defines a ledge surrounding the at least one window, wherein the at least one window is bonded to the ledge.

19. The delivery vehicle of claim 18, further comprising a slide assembly connected with the passenger door to allow the passenger door to slide between an open position and a closed position, wherein the slide assembly includes one or more components that wedge together when the passenger door is moved to closed position to limit vertical movement of the passenger door.

* * * * *